(12) United States Patent
Mehdipour

(10) Patent No.: US 12,157,709 B2
(45) Date of Patent: Dec. 3, 2024

(54) PROCESS FOR PRODUCTION OF HYDRAULIC-CARBONATING BINDER SYSTEMS THROUGH MECHANOCHEMICAL ACTIVATION OF MINERALS

(71) Applicant: CARBONBUILT, INC., El Segundo, CA (US)

(72) Inventor: Iman Mehdipour, Los Angeles, CA (US)

(73) Assignee: CarbonBuilt, Inc., El Segundo, CA (US)

( * ) Notice: Subject to any disclaimer, the term of this patent is extended or adjusted under 35 U.S.C. 154(b) by 0 days.

(21) Appl. No.: 18/470,396

(22) Filed: Sep. 19, 2023

(65) Prior Publication Data

US 2024/0043324 A1 Feb. 8, 2024

Related U.S. Application Data

(63) Continuation of application No. PCT/US2023/018395, filed on Apr. 12, 2023.

(60) Provisional application No. 63/362,886, filed on Apr. 12, 2022.

(51) Int. Cl.
| | | |
|---|---|---|
| C04B 7/32 | (2006.01) | |
| C04B 7/52 | (2006.01) | |
| C04B 28/06 | (2006.01) | |

(52) U.S. Cl.
CPC .................. *C04B 7/32* (2013.01); *C04B 7/52* (2013.01); *C04B 28/06* (2013.01)

(58) Field of Classification Search
CPC .............. C04B 7/32; C04B 7/52; C04B 28/06
See application file for complete search history.

(56) References Cited

U.S. PATENT DOCUMENTS

| | | | |
|---|---|---|---|
| 2,117,348 A | 5/1938 | Muskat | |
| 2,802,719 A | 8/1957 | Avedikian | |
| 3,725,259 A | 4/1973 | De Pree | |
| 3,920,800 A | 11/1975 | Harris | |
| 4,093,690 A | 6/1978 | Murray | |
| 4,318,996 A | 3/1982 | Magder | |
| 4,379,870 A | 4/1983 | Matsumoto | |
| 4,432,666 A | 2/1984 | Frey et al. | |
| 4,452,635 A | 6/1984 | Noshi et al. | |
| 4,828,620 A | 5/1989 | Mallow et al. | |
| 5,043,017 A | 8/1991 | Passaretti | |
| 5,362,460 A | 11/1994 | Laird et al. | |
| 5,435,846 A | 7/1995 | Tatematsu et al. | |
| 5,455,013 A | 10/1995 | Shibata et al. | |
| 5,518,540 A | 5/1996 | Jones, Jr. | |
| 5,744,078 A | 4/1998 | Soroushian et al. | |
| 5,798,328 A | 8/1998 | Kottwitz et al. | |
| 5,928,420 A | 7/1999 | Oates et al. | |
| 6,228,161 B1 | 5/2001 | Drummond | |
| 6,264,736 B1 | 7/2001 | Knopf et al. | |
| 6,416,727 B1 | 7/2002 | Virtanen | |
| 6,569,923 B1 | 5/2003 | Slagter | |
| 6,908,507 B2 | 6/2005 | Lalande et al. | |
| 6,989,142 B2 | 1/2006 | Liu et al. | |
| 7,361,324 B2 | 4/2008 | Liu et al. | |
| 7,413,014 B2 | 8/2008 | Chatterji et al. | |
| 7,753,618 B2 | 7/2010 | Constantz et al. | |
| 7,754,169 B2 | 7/2010 | Constantz et al. | |
| 7,771,684 B2 | 8/2010 | Constantz et al. | |
| 7,815,880 B2 | 10/2010 | Constantz et al. | |
| 7,842,126 B1 | 11/2010 | Dilmore et al. | |
| 7,879,305 B2 | 2/2011 | Reddy et al. | |
| 7,887,618 B2 | 2/2011 | Constantz et al. | |
| 7,887,694 B2 | 2/2011 | Constantz et al. | |
| 7,896,953 B1 | 3/2011 | Goswami et al. | |
| 7,914,758 B2 | 3/2011 | Murray | |
| 7,919,064 B2 | 4/2011 | Kawatra et al. | |
| 7,947,240 B2 | 5/2011 | Vandor | |
| 8,012,445 B2 | 9/2011 | Maijala et al. | |
| 8,021,477 B2 | 9/2011 | Brown et al. | |
| 8,066,965 B2 | 11/2011 | Fradette et al. | |
| 8,088,292 B2 | 1/2012 | Neumann et al. | |

(Continued)

FOREIGN PATENT DOCUMENTS

| AU | 2005290082 B2 | 3/2011 |
|---|---|---|
| CN | 111760436 A | 10/2020 |

(Continued)

OTHER PUBLICATIONS

Abbasi et al., "An investigation of the effect of $RuO_2$ on the deactivation and corrosion mechanism of a $Ti/IrO_2+Ta_{2O5}$ coating in an OER application", journal of Electroanalytical Chemistry 777: 67-74 (2016).

(Continued)

*Primary Examiner* — Anthony J Green
(74) *Attorney, Agent, or Firm* — SQUIRE PATTON BOGGS (US)

(57) ABSTRACT

Described herein are processes for synthesizing hydraulic-carbonating binder systems through mechanochemical process, including providing a blend of material stream one of aluminosilicate or calcium aluminosilicate mineral material and material stream two of alkaline-rich mineral material; and simultaneously fractioning the blended minerals while contacting the blended minerals with a $CO_2$-containing in the mechanochemical reactor. This binder system is useful for cementation functions in concrete. The precipitated carbonation products are mainly calcium carbonates ($CaCO_3$), magnesium carbonates ($MgCO_3$), and amorphous alumina-silica gel. The developed binder system is activated through hydration and/or concurrent hydration-carbonation reactions in concrete and it can be utilized in the form of slurry or dried powder for a wide range of precast and cast-in-place or ready-mix concrete applications. The binder system reacts with cement in concrete to form carbonate/calcium-silicate-hydrate (C—S—H) composite phases that result in enhanced mechanical properties.

20 Claims, 18 Drawing Sheets

(56) References Cited

U.S. PATENT DOCUMENTS

| | | |
|---|---|---|
| 8,137,444 B2 | 3/2012 | Farsad et al. |
| 8,163,066 B2 | 4/2012 | Eisenberger |
| 8,182,757 B2 | 5/2012 | Maijala et al. |
| 8,226,917 B2 | 7/2012 | Fan et al. |
| 8,252,242 B2 | 8/2012 | Vandor |
| 8,262,777 B2 | 9/2012 | Neumann et al. |
| 8,333,944 B2 | 12/2012 | Constantz et al. |
| 8,383,072 B2 | 2/2013 | Smedley et al. |
| 8,404,909 B2 | 3/2013 | Jadhav |
| 8,431,100 B2 | 4/2013 | Constantz et al. |
| 8,491,858 B2 | 7/2013 | Seeker et al. |
| 8,501,125 B2 | 8/2013 | Vandor |
| 8,507,228 B2 | 8/2013 | Simpson et al. |
| 8,617,500 B2 | 12/2013 | Lafarge |
| 8,691,175 B2 | 4/2014 | Kendall et al. |
| 8,757,072 B2 | 6/2014 | Garcia et al. |
| 8,771,621 B2 | 7/2014 | Karbarz |
| 8,852,319 B2 | 10/2014 | Wijmans et al. |
| 8,864,876 B2 | 10/2014 | Neumann et al. |
| 8,894,747 B2 | 11/2014 | Eisenberger et al. |
| 9,061,237 B2 | 6/2015 | Eisenberger et al. |
| 9,061,940 B2 | 6/2015 | Chen et al. |
| 9,163,297 B2 | 10/2015 | Langley |
| 9,205,371 B2 | 12/2015 | Cooper et al. |
| 9,221,027 B2 | 12/2015 | Kuppler et al. |
| 9,227,153 B2 | 1/2016 | Eisenberger |
| 9,382,120 B2 | 7/2016 | Dakhil |
| 9,382,157 B2 | 7/2016 | Guzzetta et al. |
| 9,388,072 B1 | 7/2016 | Niven et al. |
| 9,433,886 B2 | 9/2016 | Smedley et al. |
| 9,440,189 B2 | 9/2016 | Mercier et al. |
| 9,463,580 B2 | 10/2016 | Forgeron et al. |
| 9,469,547 B2 | 10/2016 | Kniesburges |
| 9,475,000 B2 | 10/2016 | Benyahia |
| 9,492,945 B2 | 11/2016 | Niven et al. |
| 9,555,365 B2 | 1/2017 | Eisenberger et al. |
| 9,677,154 B2 | 6/2017 | Karbarz |
| 9,707,513 B2 | 7/2017 | Constantz et al. |
| 9,714,406 B2 | 7/2017 | Constantz et al. |
| 9,757,688 B2 | 9/2017 | Mukherji |
| 9,786,940 B2 | 10/2017 | Langley |
| 9,789,439 B2 | 10/2017 | Siller et al. |
| 9,790,131 B2 | 10/2017 | Lee et al. |
| 9,808,759 B2 | 11/2017 | Balfe et al. |
| 9,861,931 B2 | 1/2018 | Kuopanportti et al. |
| 9,902,652 B2 | 2/2018 | Devenney et al. |
| 9,993,799 B2 | 6/2018 | Constantz et al. |
| 10,010,829 B2 | 7/2018 | Wright et al. |
| 10,017,739 B2 | 7/2018 | Tedder et al. |
| 10,233,127 B2 | 3/2019 | Atakan |
| 10,322,371 B2 | 6/2019 | Constantz et al. |
| 10,351,478 B2 | 7/2019 | Quinn et al. |
| 10,390,496 B2 | 8/2019 | Carson |
| 10,392,305 B2 | 8/2019 | Wang et al. |
| 10,584,038 B2 | 3/2020 | Maurer et al. |
| 10,668,443 B2 | 6/2020 | Kuppler et al. |
| 10,781,140 B2 | 9/2020 | Patten et al. |
| 10,940,433 B2 | 3/2021 | Mendoza et al. |
| 10,968,142 B2 | 4/2021 | Sant et al. |
| 11,040,898 B2 | 6/2021 | Sant et al. |
| 11,230,473 B2 | 1/2022 | Sant et al. |
| 11,339,094 B2 | 5/2022 | Sant et al. |
| 11,359,862 B1 | 6/2022 | Nyer |
| 11,384,029 B2 | 7/2022 | Sant et al. |
| 11,772,976 B2 | 10/2023 | Sinha |
| 2001/0023655 A1 | 9/2001 | Knopf |
| 2002/0103074 A1 | 8/2002 | Wheelock et al. |
| 2002/0158018 A1 | 10/2002 | Abramowitz et al. |
| 2002/0168473 A1 | 11/2002 | Ottersbach |
| 2003/0213937 A1 | 11/2003 | Yaniv |
| 2004/0077787 A1 | 4/2004 | Karande |
| 2005/0180910 A1 | 8/2005 | Park et al. |
| 2005/0238563 A1 | 10/2005 | Eighmy et al. |
| 2005/0242032 A1 | 11/2005 | Sugito et al. |
| 2006/0099132 A1 | 5/2006 | Erdman |
| 2006/0247450 A1 | 11/2006 | Wu et al. |
| 2007/0186821 A1 | 8/2007 | Brown et al. |
| 2008/0004449 A1 | 1/2008 | Yong et al. |
| 2008/0156232 A1 | 7/2008 | Crudden |
| 2008/0245274 A1 | 10/2008 | Ramme |
| 2008/0245672 A1 | 10/2008 | Little et al. |
| 2009/0001020 A1 | 1/2009 | Constantz et al. |
| 2009/0013742 A1 | 1/2009 | Zhang et al. |
| 2009/0056707 A1 | 3/2009 | Foody et al. |
| 2009/0081096 A1 | 3/2009 | Pellegrin |
| 2009/0169452 A1 | 7/2009 | Constantz et al. |
| 2009/0214408 A1 | 8/2009 | Blake et al. |
| 2010/0083880 A1 | 4/2010 | Constantz et al. |
| 2010/0251632 A1 | 10/2010 | Chen |
| 2011/0006700 A1 | 1/2011 | Chen et al. |
| 2011/0033239 A1 | 2/2011 | Constantz et al. |
| 2011/0174156 A1 | 7/2011 | Saunders et al. |
| 2011/0195017 A1 | 8/2011 | Martinez Martinez et al. |
| 2011/0226010 A1 | 9/2011 | Baxter |
| 2011/0268633 A1 | 11/2011 | Zou |
| 2011/0290155 A1 | 12/2011 | Vlasopoulos |
| 2012/0082839 A1 | 4/2012 | Ha |
| 2012/0111236 A1 | 5/2012 | Constantz et al. |
| 2012/0186492 A1 | 7/2012 | Gane et al. |
| 2013/0008355 A1 | 1/2013 | Stokes |
| 2013/0036945 A1 | 2/2013 | Constantz et al. |
| 2013/0058857 A1 | 3/2013 | Stern et al. |
| 2013/0167756 A1 | 7/2013 | Chen et al. |
| 2013/0315810 A1 | 11/2013 | Stallmann et al. |
| 2014/0097557 A1 | 4/2014 | Alhozaimy |
| 2014/0197563 A1 | 7/2014 | Niven |
| 2014/0356267 A1 | 12/2014 | Hunwick |
| 2015/0167550 A1 | 6/2015 | Vandervort et al. |
| 2015/0225295 A1 | 8/2015 | McCandlish et al. |
| 2015/0307400 A1 | 10/2015 | Devenney et al. |
| 2016/0082387 A1 | 3/2016 | Constantz et al. |
| 2016/0177344 A1 | 6/2016 | Subhas et al. |
| 2016/0280598 A1 | 9/2016 | Wang et al. |
| 2016/0362800 A1 | 12/2016 | Ren et al. |
| 2017/0182458 A1 | 6/2017 | Jiang et al. |
| 2017/0226021 A1 | 8/2017 | Sant et al. |
| 2017/0369329 A1 | 12/2017 | Paynter et al. |
| 2018/0238157 A1 | 8/2018 | Fu et al. |
| 2018/0341887 A1 | 11/2018 | Kislovskiy et al. |
| 2019/0177220 A1 | 6/2019 | Sant et al. |
| 2019/0232215 A1 | 8/2019 | Fujita et al. |
| 2019/0232216 A1 | 8/2019 | Constantz et al. |
| 2019/0367390 A1 | 12/2019 | Sant et al. |
| 2020/0062645 A1 | 2/2020 | Gong et al. |
| 2020/0129916 A1 | 4/2020 | Constantz et al. |
| 2020/0180964 A1 | 6/2020 | Sant et al. |
| 2020/0299203 A1 | 9/2020 | Sant et al. |
| 2020/0385280 A1 | 12/2020 | Dai et al. |
| 2021/0024364 A1 | 1/2021 | Sant et al. |
| 2021/0031154 A1 | 2/2021 | Nakamura et al. |
| 2021/0060484 A1 | 3/2021 | Aziz et al. |
| 2021/0069637 A1 | 3/2021 | Ghasemi et al. |
| 2021/0101107 A1 | 4/2021 | Heidel et al. |
| 2021/0107840 A1 | 4/2021 | Gong |
| 2021/0120750 A1 | 4/2021 | Bourhis et al. |
| 2021/0146300 A1 | 5/2021 | Mohamed et al. |
| 2021/0147239 A1 | 5/2021 | Sinha |
| 2021/0188671 A1 | 6/2021 | Sant et al. |
| 2021/0198157 A1 | 7/2021 | Sant et al. |
| 2021/0262320 A1 | 8/2021 | Nguyen et al. |
| 2021/0263320 A1 | 8/2021 | Seidman et al. |
| 2021/0354084 A1 | 11/2021 | Wang et al. |
| 2021/0387139 A1 | 12/2021 | Voskian et al. |
| 2022/0064066 A1 | 3/2022 | Sant et al. |
| 2022/0106194 A1 | 4/2022 | Pedroso et al. |
| 2022/0204401 A1 | 6/2022 | Sant et al. |
| 2022/0212935 A1 | 7/2022 | Sant et al. |
| 2022/0227677 A1 | 7/2022 | Mehdipour et al. |
| 2022/0288526 A1 | 9/2022 | Ahmed et al. |
| 2022/0331740 A1 | 10/2022 | Simonetti et al. |
| 2022/0362737 A1 | 11/2022 | Staufcik et al. |
| 2022/0380265 A1 | 12/2022 | Sant et al. |
| 2022/0396526 A1 | 12/2022 | Sinha |
| 2022/0396527 A1 | 12/2022 | Sinha |

(56) References Cited

U.S. PATENT DOCUMENTS

| | | |
|---|---|---|
| 2023/0058065 A1 | 2/2023 | Sant et al. |
| 2023/0312350 A1 | 10/2023 | Sinha |
| 2023/0339761 A1 | 10/2023 | Sinha |

FOREIGN PATENT DOCUMENTS

| | | |
|---|---|---|
| EP | 2438977 B1 | 8/2014 |
| EP | 3177384 A2 | 6/2017 |
| EP | 3515879 A1 | 7/2019 |
| EP | 3656750 A2 | 5/2020 |
| EP | 3744700 A1 | 12/2020 |
| EP | 3778525 A1 | 2/2021 |
| JP | H05-294693 A | 11/1993 |
| JP | H05-330878 A | 12/1993 |
| JP | 2002-145650 A | 5/2002 |
| JP | 6970469 B1 | 11/2021 |
| WO | WO 2000/060141 A1 | 10/2000 |
| WO | WO 2009/078430 A1 | 6/2009 |
| WO | WO 2010/006242 A1 | 1/2010 |
| WO | WO 2014/005227 A1 | 1/2014 |
| WO | WO 2014/009802 A2 | 1/2014 |
| WO | WO 2015/112655 A2 | 7/2015 |
| WO | WO 2015/154174 A1 | 10/2015 |
| WO | WO 2016/022522 A2 | 2/2016 |
| WO | WO 2016/061251 A1 | 4/2016 |
| WO | WO 2018/011567 A1 | 1/2018 |
| WO | WO 2018/058139 A1 | 3/2018 |
| WO | WO 2018/081308 A1 | 5/2018 |
| WO | WO 2018/081310 A1 | 5/2018 |
| WO | WO 2019/006352 A1 | 1/2019 |
| WO | WO 2019/036386 A1 | 2/2019 |
| WO | WO 2019/036676 A1 | 2/2019 |
| WO | WO 2022/221665 A1 | 10/2022 |
| WO | WO 2023/069370 A1 | 4/2023 |

OTHER PUBLICATIONS

Adenier et al., "Electrochemical Oxidation of Aliphatic Amines and Their Attachment to Carbon and Metal Surfaces," Langmuir, 20: 8243-8253 (2004).
Arshad et al., "Equilibrium Solubility of $CO_2$ in Alkanolamines," DTU Libraryy: 5 pages (2013).
Buck, "Alkali Reactivity of Strained Quartz as a Constituent of Concrete Aggregate," Aug. 1983, 17 pages.
Communication Pursuant to Rules 70(2) and 70a(2) EPC on EP 18845904.4 dated Apr. 28, 2021.
Dutcher et al., "Amine-Based $CO_2$ Capture Technology Development from the Beginning of 2013—A Review," ACS Applied Materials & Interfaces, 7: 2137-2148 (2015).
Eisaman et al., "$CO_2$ separation using bipolar membrane electrodialysis," Energy & Environmental Science, 4: 1319-1328 (2011).
Erans et al., "Direct air capture: process technology, technoeconomic and socio-political challenges," Energy & Environmental Science, 15: 1360-1405 (2022), DOI: 10.1039/d1ee03523a.
Examination Report on IN 201927016758 dated Dec. 14, 2020, 5 pages.
Extended European Search Report on EP Application 18845904.4 dated Apr. 7, 2021.
Extended European Search Report on EP Application No. 17865241.8 dated May 15, 2020, 6 pages.
Falzone et al., "New insights into the mechanisms of carbon dioxide mineralization by portlandite", AIChE Journal, 67(5), 2021, pp. 1-12, 12 pages; AIChE J. 2021;e17160. https://doi.org/10.1002/aic.17160.
Fujimura et al., "Oxygen evolution on manganese-molybdenum oxide anodes in seawater electrolysis", Materials Science and Engineering: A 267.2: 254-259 (1999).
Hashimoto et al., "Advanced materials for global carbon dioxide recycling", Materials Science and Engineering: A 304: 88-96 (2001).
Husebye et al., "Techno economic evaluation of amine based $CO_2$ capture: impact of $CO_2$ concentration and steam supply," Energy Procedia, 23: 381-390 (2012).
International Preliminary Report on Patentability for PCT/US2017/058359 dated May 9, 2019, 7 pages.
International Preliminary Report on Patentability issued in PCT/US2018/040373 dated Jan. 9, 2020, 5 pages.
International Preliminary Report on Patentability on PCT/US2018/046557 dated Feb. 27, 2020, 7 pages.
International Search Report and Written Opinion for Application No. PCT/US2022/025028 dated Jul. 13, 2022.
International Search Report and Written Opinion for International Application No. PCT/US2015/055564 dated Jan. 22, 2016, 13 pages.
International Search Report and Written Opinion issued in PCT Application No. PCT/US2018/040373 dated Sep. 20, 2018, 7 pages.
International Search Report and Written Opinion, issued in corresponding International Application No. PCT/US2018/046557 dated Dec. 17, 2018, 12 pages.
International Search Report and Written Opinion, issued in International Application No. PCT/US2017/058359 dated Jan. 9, 2019, 8 pages.
International Search Report and Written Opinion dated Jun. 15, 2023, for International Application No. PCT/US2023/013350, 10 pages.
International Search Report and Written Opinion dated Sep. 15, 2023, for International Application No. PCT/US2023/018395, 11 pages.
Ivy, "Summary of Electrolytic Hydrogen Production Milestone Completion Report," National Renewable Energy Laboratory: 27 pages (2004).
Keith et al., "A Process for Capturing $CO_2$ from the Atmosphere," Joule, 2: 1573-1594 (2018).
Keith et al., "Climate Strategy with $CO_2$ Capture From The Air," Climatic Changes: 29 pages (2005).
La Plante et al., "Electrolytic seawater mineralization and how it ensures (net) carbon dioxide removal", Submitted to ACS ES&T Engineering, Jan. 2023, 23 pages.
La Plante et al., "Controls on $CO_2$ Mineralization Using Natural and Industrial Alkaline Solids under Ambient Conditions", ACS Sustainable Chem. Eng., 9(32), pp. 10727-10739, 2021.
Li et al., "pH control using polymer-supported phosponic acids as reusable buffer agents," Green Chem., 2015, vol. 17, pp. 3771-3774.
Liu et al., "Electrochemically mediated carbon dioxide separation with quinone chemistry in salt-concentrated aqueous media," Nature Communications, 11: Article No. 2278 pp. 1-11 (2020).
Lv et al., "Mechanisms of $CO_2$ Capture into Monoethanolamine Solution with Different CO2 Loading during the Absorption/Desorption Processes," Enviromental Science & Technology, 49: 10728-10735 (2015).
Macdowell et al., "An overview of $CO_2$ capture technologies," Energy & Environmental Science, 3: 1645-1669 (2010).
Marshall et al., "A review of adhesion science", Dental materials 26.2: e11-e16 (2010).
Mehdipour et al., "How Microstructure and Pore Moisture Affect Strength Gain in Portlandite-Enriched Composites That Mineralize $CO_2$", ACS Sustainable Chem. Eng., 7(15), pp. 13053-13061, 2019.
Mehdipour et al., "The role of gas flow distributions on $CO_2$ mineralization within monolithic cemented composites: coupled CFD-factorial design approach", Reaction Chemistry & Engineering 6 (3), pp. 494-504, 2021.
Mezza et al., "An Electrochemical Platform for the Carbon Dioxide Capture and Conversion to Syngas," Energies, 14: 7869 pp. 1-13 (2021).
Murnandari et al., "Effect of process parameters on the $CaCO_3$ production in the single process for carbon capture and mineralization", Korean Journal of Chemical Engineering, Mar. 2017, vol. 34, Issue 3, pp. 935-941.
Final Office Action on U.S. Appl. No. 15/519,524 dated Nov. 21, 2019, 13 pages.
Final Office Action on U.S. Appl. No. 15/519,524 dated Oct. 14, 2020.
Non-Final Office Action on U.S. Appl. No. 15/519,524 dated Apr. 29, 2020, 12 pages.
Non-Final Office Action on U.S. Appl. No. 15/519,524 dated May 16, 2019, 13 pages.

(56) References Cited

OTHER PUBLICATIONS

Notice of Allowance on U.S. Appl. No. 15/519,524 dated Feb. 2, 2021.
Office Action on CN 201780076640.2 dated May 7, 2021.
Rahimi et al., "Bench-scale demonstration of $CO_2$ capture with an electrochemically driven proton concentration process," RSC Advances, 10: 16832 (2020).
Ramasubramanian et al., "Membrane processes for carbon capture from coal-fired power plant flue gas: A modeling and cost study," Journal of Membrane Science (2012) 421-422: 299-310.
Rau et al., "Direct electrolytic dissolution of silicate minerals for air CO2 mitigation and carbon-negative $H_2$ production," PNAS, 110(25): 10095-10100 (2013).
Reddy et al., "Simultaneous capture and mineralization of coal combustion flue gas carbon dioxide ($CO_2$)," Energy Procedia, 4, (2011), pp. 1574-1583.
Rinberg et al., "Alkalinity Concentration Swing for Direct Air Capture of Carbon Dioxide," ChemSusChem, 14: 1-16 (2021).
Roussanaly et al., "Techno-economic analysis of MEA $CO_2$ capture from a cement kiln—impact of steam supply scenario," Energy Procedia, 114: 6229-6239 (2017).
Sabatino et al., "Evaluation of a Direct Air Capture Process Combining Wet Scrubbing and Bipolar Membrane Electrodialysis," Industrial & Engineering Chemistry Research, 59: 7007-7020 (2020).
Sakwattanapong et al., "Behavior of Reboiler Heat Duty for $CO_2$ Capture Plants Using Regenerable Single and Blended Alkanolamines," Ind. Eng. Chem. Res., 44: 4465-4473 (2005).
Shu et al., "Electrochemical Regeneration of Spent Alkaline Absorbent from Direct Air Capture," Environmental Science & Technology, 54: 8990-8998 (2020).
Stern et al., "Bench-scale demonstration of $CO_2$ capture with electrochemically-mediated amine regeneration," RSC Advances, 4: 5906-5914 (2014).
Stern et al., "Post-combustion carbon dioxide capture using electrochemically mediated amine regeneration," Energy & Environmental Science, 6: 2505-2517 (2013).
Stripe Carbon Removal Purchase Application submitted Mar. 31, 2022.
Tang et al., "Advances in the application of manganese dioxide and its composites as electrocatalysts for the oxygen evolution reaction", Journal of Materials Chemistry A 8(36): 18492-18514 (2020).
Vance et al., "Direct Carbonation of $Ca(OH)_2$ Using Liquid and Supercritical $CO_2$: Implications for Carbon-Neutral Cementation", Ind. Eng. Chem. Res., 54(36), pp. 8908-8918, 2015.
Voskian et al., "Faradaic electro-swing reactive adsorption for $CO_2$ capture," Energy & Environmental Science, 12: 3530-3547 (2019).
Wang et al. "Technoeconomic Analysis of the Electrochemically Mediated Amine Regeneration $CO_2$ Capture Process" Ind. Eng. Chem. Res., 59: 14085-14095 (Year: 2020).
Wang et al., "$CO_2$ Capture Using Electrochemically Mediated Amine Regeneration," Ind. Eng. Chem. Res. 2020, 59, 15, 7087-7096 27 pages (2020).
Wang et al., "Energetics of electrochemically mediated amine regeneration process for flue gas $CO_2$ capture," International Journal of Greenhouse Gas Control, 82: 48-58 (2019).
Wang et al., "Flue gas $CO_2$ capture via electrochemically mediated amine regeneration: System design and performance," Applied Energy, 255: 113879 (2019).
Wang et al., "Integration of $CO_2$ capture and storage based on pH-swing mineral carbonation using recyclable ammonium salts," Energy Procedia 4, 2011, 4930-4936.
Wei et al., "Clinkering-Free Cementation by Fly Ash Carbonation", Journal of $CO_2$ Utilization, 23, pp. 117-127, 2018.
Final Office Action on U.S. Appl. No. 18/171,164 dated Sep. 29, 2023, 14 pages.
Glushkov et al., "Composition of gas produced from the direct combustion and pyrolysis of biomass", Process Safety and Environmental Protection, V. 156, 2021, pp. 43-56.
International Search Report and Written Opinion for International Application No. PCT/US2022/046917 dated Feb. 8, 2023, 15 pages.
International Search Report and Written Opinion dated Oct. 9, 2023, for International Application No. PCT/US2023/024217, 14 pages.
Non-Final Office Action on U.S. Appl. No. 18/171,164 dated Jun. 6, 2023, 16 pages.
Sanz-Pérez et al., "Direct Capture of $CO_2$ from Ambient Air", Chem. Rev., 2016, vol. 116, pp. 11840-11876, 37 pages.
Vega-Vila et al., "Metal cations as inorganic structure-directing agents during the synthesis of phillipsite and tobermorite", Reaction Chemistry and Engineering, Mar. 2023, vol. 8, pp. 1176-1184.
Non-Final Office Action dated Mar. 6, 2024, for U.S. Appl. No. 18/171,164, 22 pages.
International Preliminary Report on Patentability for PCT/US2022/031843 dated Nov. 21, 2023, 13 pages.
International Search Report and Written Opinion for Application No. PCT/US2022/031843 dated Nov. 7, 2022, 22 pages.
Manovic et al., "Core-in-Shell CaO/CuO-Based Composite for $CO_2$ Capture", Industrial & Engineering Chemistry Research, vol. 50(22), Nov. 2011, pp. 12384-12391, 8 pages.
Montagnaro et al, "Assessment of ettringite from hydrated FBC residues as a sorbent for fluidized bed desulphurization", Fuel, vol. 82(18), Dec. 2003, pp. 2299-2307, 10 pages.
Montagnaro et al., "Steam reactivation of a spent sorbent for enhanced $SO_2$ capture in FBC", AICHE Journal, vol. 52(12), Oct. 2006, pp. 4090-4098, 10 pages.
Montagnaro et al., "An assessment of water and steam reactivation of a fluidized bed spent sorbent for enhanced $SO_2$ capture", Powder Technology, vol. 180(1-2), Jan. 2008, pp. 129-134, 6 pages.
Rao et al., "Carbonation of FBC ash by sonochemical treatment", Fuel, vol. 86(16), Oct. 2007, pp. 2603-2615, 14 pages.

PROCESS FOR PRODUCTION OF HYDRAULIC-CARBONATING BINDER SYSTEMS THROUGH MECHANOCHEMICAL ACTIVATION OF MINERALS

CROSS-REFERENCE TO RELATED APPLICATIONS

The application is a continuation application of International Patent Application No. PCT/US2023/018395, filed Apr. 12, 2023, which claims priority to, and the benefit of, U.S. Provisional Patent Application No. 63/362,886, filed Apr. 12, 2022, and entitled Process for production of hydraulic-carbonating binder systems through mechanochemical activation of minerals, the entire contents of all which are herein incorporated by reference in its entirety for all purposes.

FIELD

The present disclosure concerns the production of hydraulic-carbonating binder systems, in which a mixture of alkaline and aluminosilicate or calcium silicate minerals is contacted with $CO_2$-containing gas streams in a mechanochemical reactor process. The binder system produced by this process is activated through hydration/pozzolanic and carbonation reactions. This binder system is useful for cementation functions in concrete.

BACKGROUND

Certain mineral-based materials (e.g., lime (CaO), portlandite ($Ca(OH)_2$), etc. . . . ) are effective in reacting with carbon dioxide ($CO_2$), sulfur trioxide ($SO_3$), sulfur dioxide ($SO_2$), nitrogen dioxide ($NO_2$), nitrogen trioxide ($NO_3$) and hydrogen chloride (HCl), and other flue gas components and are used to capture them from flue gas streams. For example, when portlandite-based sorbents are used for flue gas treatment (FGT), $Ca(OH)_2$ reacts with the flue gas components (e.g., $CO_2$, CO, SOX, NOR, HCl) to form, e.g., calcium carbonate ($CaCO_3$), calcium sulfite ($CaSO_3$), calcium sulfate ($CaSO_4$), and/or calcium chloride ($CaCl_2$)), among other compounds. After such sorbents react with flue gas, they are considered a type of sorbent/scrubbing residues. Certain mineral residues used in FGTs, such as but not limited to lime or portlandite, may be made of a mixture of unreacted mineral sorbent (e.g., calcium oxide, calcium hydroxide, etc. . . . ) and spent sorbent (e.g., comprising calcium sulfates, calcium sulfites, calcium chlorides, calcium nitrate, calcium nitrite, and calcium carbonate compounds, etc. . . . ), depending on the FGT process type, FGT raw materials, the FGT process characteristics, and the points of collection of the mineral residues. Also, calcium carbonate and/or calcium sulfate forms on portlandite particle surfaces in FGT processes, when portlandite is used as a sorbent. This calcium carbonate and/or calcium sulfate passivates the particle surfaces before the calcium hydroxide in the core of the particle can fully react with flue gas components. Calcium carbonate and/or calcium sulfate passivates the surface of portlandite and reduces the chemical accessibility of any unreacted calcium hydroxide core within the portlandite residues to reactions with $CO_2$ gas. Such effects significantly reduce the performance efficiency of alkaline sorbent residues and thus limit the use (or reuse) potential in concrete applications.

The high free-lime content present in some alkaline-rich (e.g., Ca- and Mg-rich) industrial mineral residues (e.g., lime, portlandite, lime kiln dust, cement kiln dust, or high free lime coal combustion residues) restricts their incorporation into concrete formulations due to the potential volumetric expansion when such industrial mineral residues are hydrated in concrete. The volumetric expansion associated with hydration can cause cracking, thus adversely affecting the mechanical performance and durability of the concrete.

Another problem with using industrial mineral residues in concrete is related to the agglomerated nature and high moisture content of the mineral residues. The agglomerates reduce reactivity (hydraulic and pozzolanic reactions) and hinder the accessibility of contacting $CO_2$-containing flue gases or water to the reactive sites of the residues, which thereby limits carbonation and hydration reactions.

Despite being the most widely available aluminosilicate supplementary cementitious material (SCM) and its many applications, only approximately half of the fly ash produced in the United States is reused annually and the remaining fly ashes are stored in landfills and ponds. Fly ashes stored in landfills typically contain 10-20% moisture, which is added with the dual purpose of dust control and optimum compaction to maximize the storage capacity of the site. On the other hand, fly ashes stored in ponds or surface impoundments are typically transported to these sites as a slurry from the plant collection system. Depending on the type of fly ash, the reclamation process may include dewatering, dredging, drying, milling, thermal treatment, classifying and storing. As the concrete production rate increases annually, the fly ash being produced annually may not meet the demand and there would be a gap between demand for SCM and fly ash available. Therefore, there is a need to utilize low quality fly ashes from landfills and ponds and make them suitable for use in concrete applications.

What is needed are new pathways to improve the performance efficiency and overcome limitations of using alkaline industrial residues through the development of binder systems for use in concrete applications while reducing carbon intensity of concrete materials. Industrial mineral residues include, but are not limited to, cement kiln dust, lime kiln dust, off-spec limes, sorbent/scrubbing residues, steel slag, iron slag, coal combustion residues such as fly ashes, ponded ashes, landfilled ashes, and bottom ashes, biomass ashes, fluidized bed combustion ashes, circulating fluidized bed ashes.

Some potential challenges related to ponded ashes are inconsistent quality, compositional variability, variability in physical and chemical characteristics, low pozzolanic reactivity, low fineness, high crystallinity, high moisture content, high unburnt carbon content, heavy metal leaching, and high sulfur content that make them not desirable for concrete use. Set forth herein are solutions to these problems and others known in the field to which this disclosure pertains.

SUMMARY

In one embodiment, set forth herein is a process for synthesizing hydraulic-carbonating binder system through mechanochemical activation comprising: providing blend of material stream one of aluminosilicate mineral material and material stream two of alkaline-rich mineral material; and simultaneously fractioning the blended minerals while contacting the blended minerals with a $CO_2$-containing in the mechanochemical reactor. The hydraulic-carbonating binder system through mechanochemical process may need to be further blended with additional alkaline rich mineral materials to supplement total alkaline content of hydraulic-carbonating binder system to enhance its carbonation reaction when exposed to $CO_2$ stream. The produced binder is activated through hydraulic/pozzolanic and carbonation reactions, and it can be used for different concrete applications such as precast and/or cast-in-place concrete applications. The carbonation reaction of binder is activated when contacting the concrete component to carbon dioxide sourced from $CO_2$ emission sources (e.g., industrial $CO_2$-containing gas stream, dilute flue gas stream, a concentrated $CO_2$ gas stream), biomass-derived $CO_2$ or atmospherically derived $CO_2$, thereby forming calcium carbonates in concrete components.

In a second embodiment, set forth herein is a process for synthesizing hydraulic-carbonating binder system through mechanochemical activation comprising: providing blend of material stream one of aluminosilicate or calcium aluminosilicate, or both, mineral material and material stream two of alkaline-rich mineral material; and simultaneously fractioning the blended minerals while contacting the blended minerals with a $CO_2$-containing in the mechanochemical reactor. The hydraulic-carbonating binder system through mechanochemical process may need to be further blended with additional alkaline rich mineral materials to supplement total alkaline content of hydraulic-carbonating binder system to enhance its carbonation reaction when exposed to $CO_2$ stream. The produced binder is activated through hydraulic/pozzolanic and carbonation reactions, and it can be used for different concrete applications such as precast and/or cast-in-place concrete applications. The carbonation reaction of binder is activated when contacting the concrete component to carbon dioxide sourced from $CO_2$ emission sources (e.g., industrial $CO_2$-containing gas stream, dilute flue gas stream, a concentrated $CO_2$ gas stream), biomass-derived $CO_2$ or atmospherically derived $CO_2$, thereby forming calcium carbonates in concrete components.

In another embodiment, set forth herein is a mechanochemical process for making a binder system, comprising: providing a mixture of aluminosilicate material and alkaline-rich mineral material; wherein the alkaline-rich mineral material is at least partially carbonated; simultaneously fractioning the mixture, while contacting the mixture with a $CO_2$-containing gas; thereby making a binder system; wherein the binder system after simultaneously fractioning the mixture, while contacting the mixture with a $CO_2$-containing gas comprises less than 85% by weight (w/w) carbonates. In certain embodiments, the binder system after simultaneously fractioning the mixture, while contacting the mixture with a $CO_2$-containing gas comprises less than 85% by weight (w/w) calcium carbonate. In some embodiments, by keeping the carbonate content lower than 85% w/w but at least 20% higher than the amount of carbonates before simultaneously fractioning the mixture, while contacting the mixture with a $CO_2$-containing gas, the binder system produced has unexpectedly improved performance characteristics, which include, but are not limited to, forming industrially suitable concrete when used in a concrete mixture and further carbonated. In some embodiments, the aluminosilicate is calcium aluminosilicate.

BRIEF DESCRIPTIONS OF THE DRAWING

FIG. 1 shows a process flow diagram for synthesizing hydraulic-carbonating binder systems by a mechanochemical process of blends of alkaline and aluminosilicate minerals. The alkaline content of hydraulic-carbonating binder systems can be further supplemented/adjusted after mechanochemical process through blending process to enhance carbonation reaction when concrete component is contacted with $CO_2$-containing gas streams to form calcium carbonate in concrete.

Figure 6:
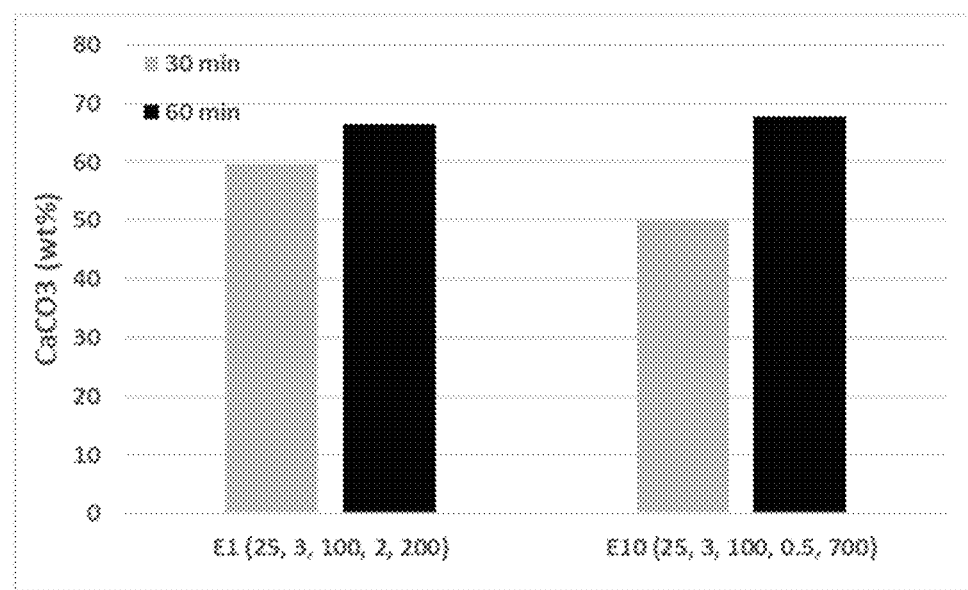

FIG. 6 shows a plot of $CaCO_3$ weight percent as a function of Phase sample. For each sample—E1 or E10—the numbers inside the parenthesis refer to, in series, the Reaction Temperature, the water-to-solid ratio, the $CO_2$ concentration, the flow rate, and the agitation ratio. For example, for E1 (25, 3, 100, 2, 200), the Reaction Temperature was 25° C., the water-to-solid ratio was 3, the $CO_2$ concentration was 100 volume percent, the flow rate was 2 slpm (standard liter per minute), and the agitation ratio was 200).

Figure 7:
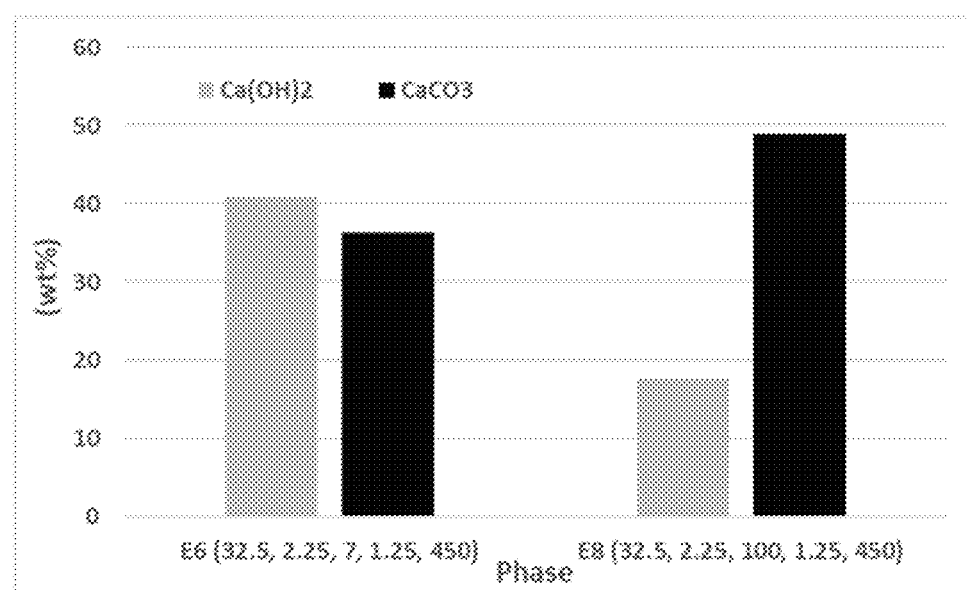

FIG. 7 shows a plot of weight percent (for $Ca(OH)_2$ and $CaCO_3$) as a function of Phase sample. For each sample—E6 or E8—the numbers inside the parenthesis refer to, in series, the Reaction Temperature, the water-to-solid ratio, the $CO_2$ concentration, the flow rate, and the agitation ratio. For example, for E6 (32.5, 2.25, 7, 1.25, 450), the Reaction Temperature was 32.5° C., the water-to-solid ratio was 2.25, the $CO_2$ concentration was 7 volume percent, the flow rate was 1.25 slpm, and the agitation ratio was 450.

Figure 8:
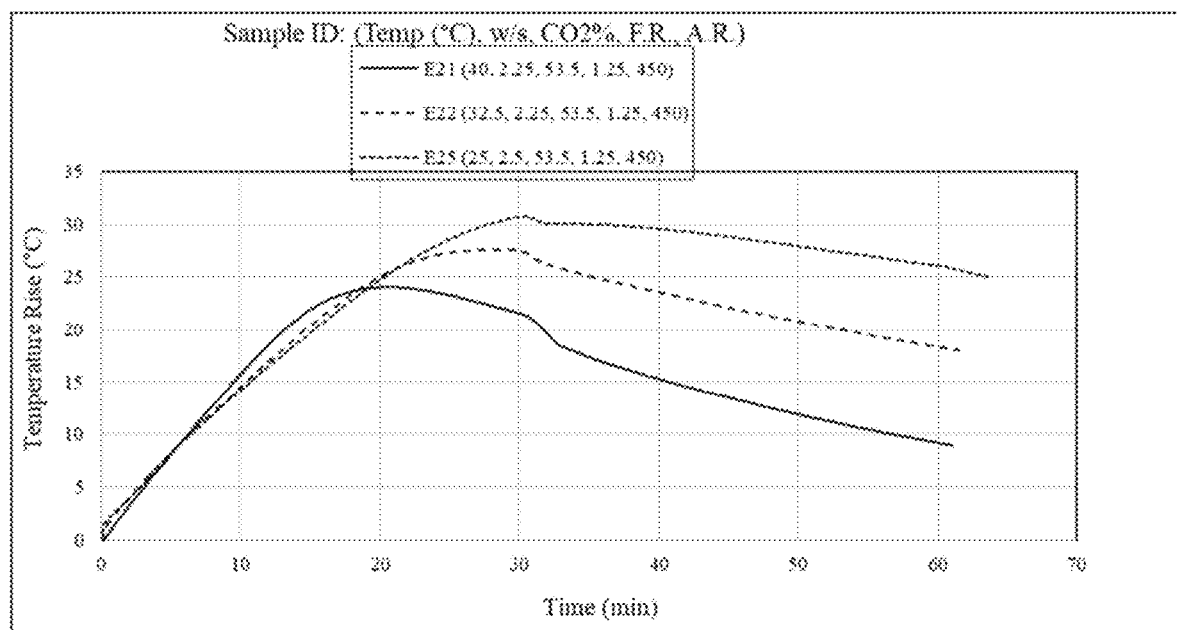

FIG. 8 shows a plot of Temperature Rise (° C.) as a function of Time (min) for three samples. For each sample—E21, E22, and E25—the numbers inside the parenthesis refer to, in series, the Reaction Temperature, the water-to-solid ratio, the $CO_2$ concentration, the flow rate, and the agitation ratio. For example, for E21 (40, 2.25, 53.5, 1.25, 450), the Reaction Temperature was 40° C., the water-to-solid ratio was 2.25, the $CO_2$ concentration was 53.5 volume percent, the flow rate was 1.25 slpm, and the agitation ratio was 450.

Figure 9:
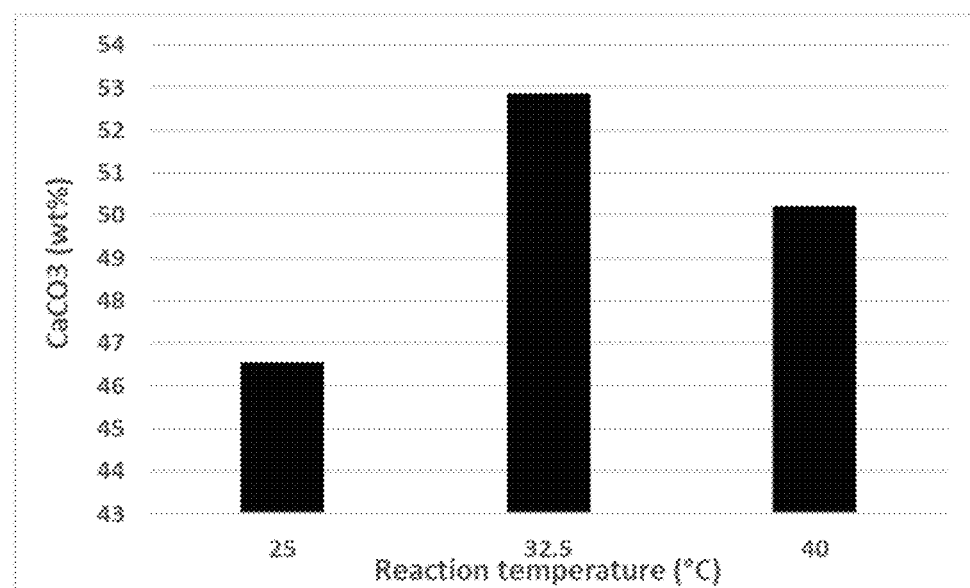

FIG. 9 shows a plot of $CaCO_3$ formed (weight percent) as a function of Reaction temperature (° C.).

Figure 10:
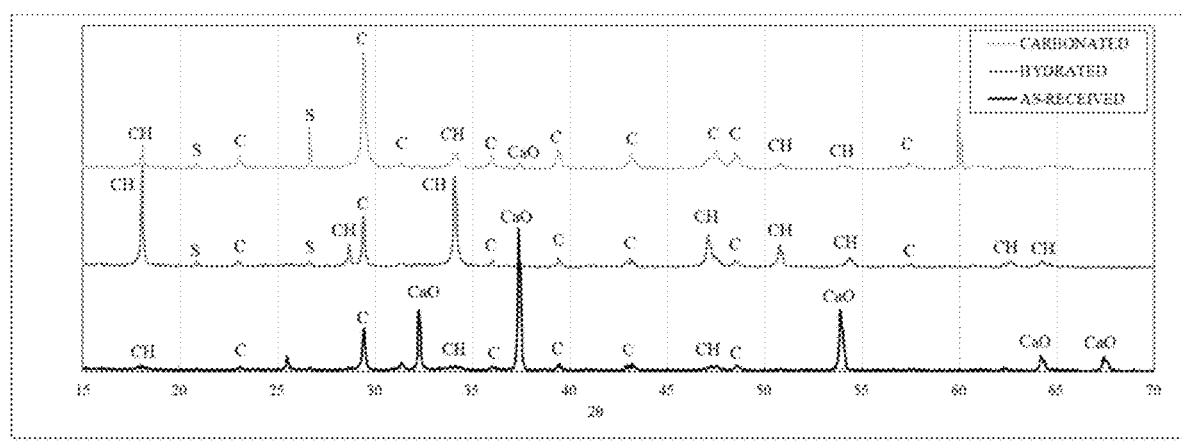

FIG. 10 shows an overlap of three x-ray diffraction plots for lime kiln dust, as-received, hydrated lime kiln dust, and carbonated lime kiln dust. The carbonated lime kiln dust plot is shown on top. The hydrated lime kiln dust plot is shown in the middle. The as-received lime kiln dust is shown on the bottom.

Figure 11:
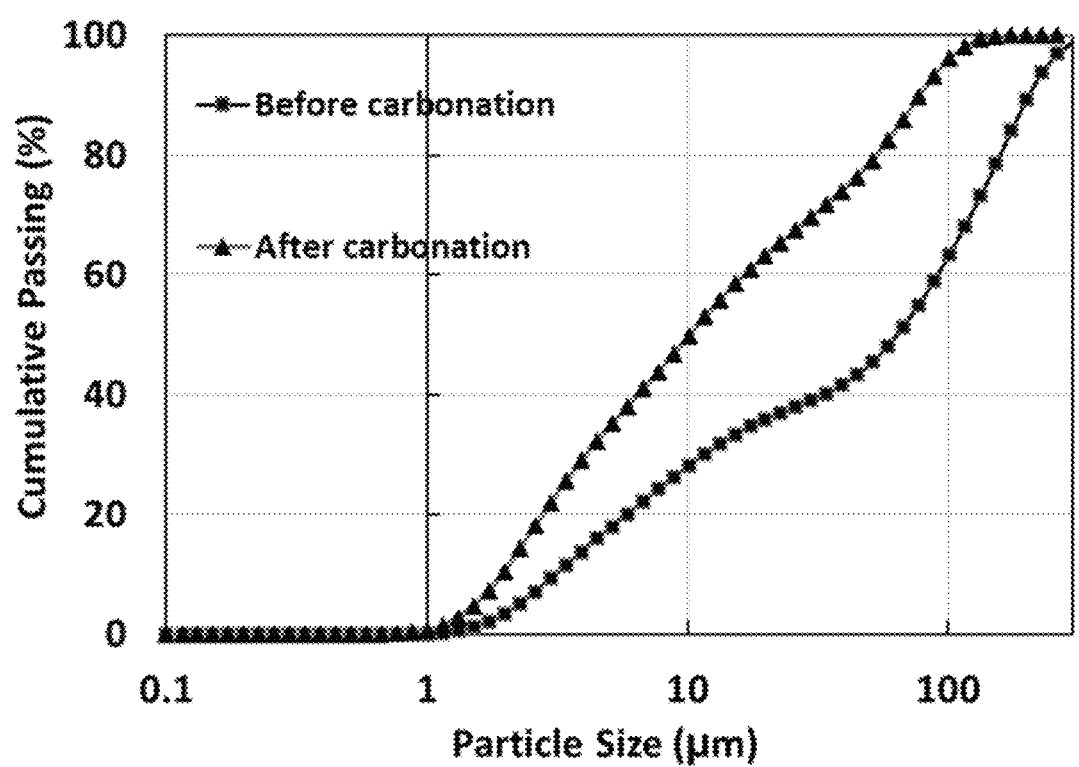

FIG. 11 shows a plot of cumulative Passing (%) as a function of Particle Size (μm) according to an embodiment.

Figure 12:
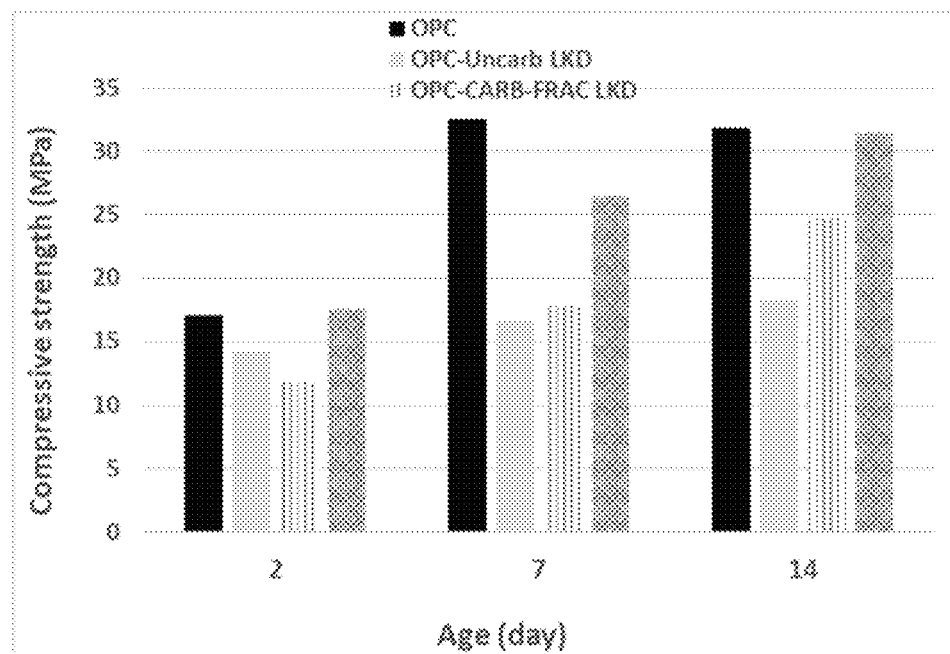

FIG. 12 shows a plot of compressive strength (MPa) as a function of Age (day) according to an embodiment. OPC stands for ordinary portland cement. OPC-Uncarb LKD stands for ordinary portland cement with uncarbonated lime kiln dust. OPC-CARB-FRAC LKD stands for ordinary portland cement with carbonated and fractionated lime kiln dust.

Figure 13:
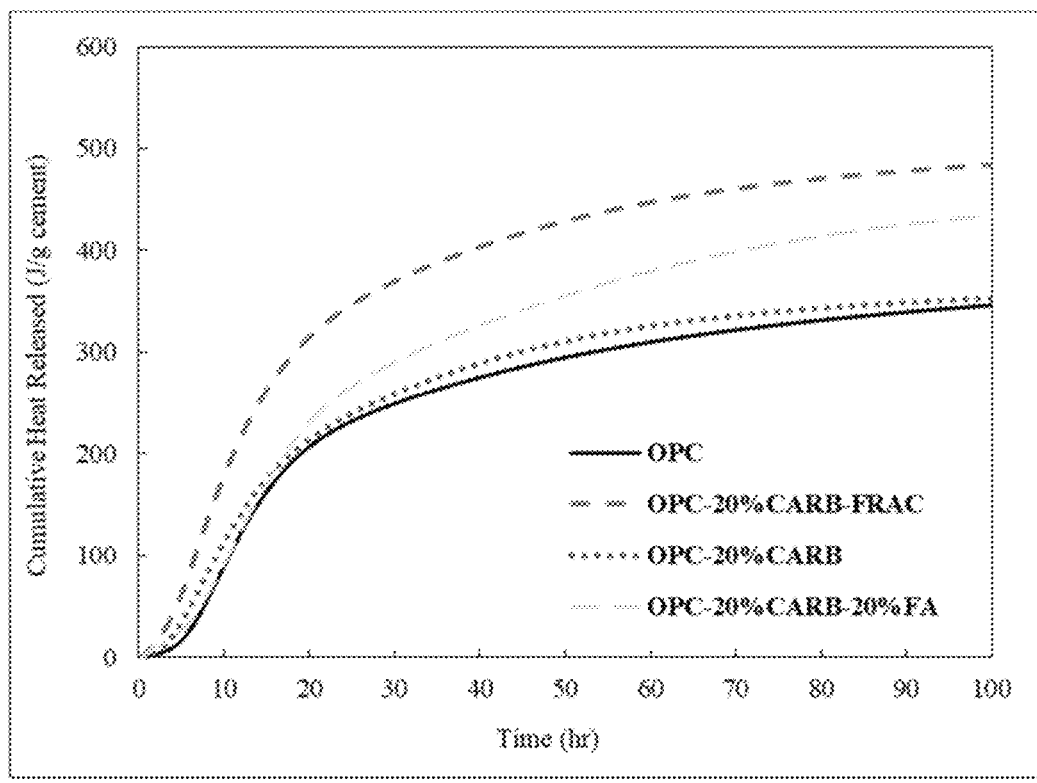

FIG. 13 shows a plot of cumulative heat released (J/g cement) as a function of time (hour also written as hr) according to an embodiment. OPC stands for ordinary portland cement. OPC-20%-CARB-FRAC stands for ordinary portland cement with 20% carbonated and fractionated lime kiln dust. OPC-20%-CARB stands for ordinary portland cement with 20% carbonated lime kiln dust. OPC-20%-CARB-20%-FRAC stands for ordinary portland cement with 20% carbonated lime kiln dust and 20% fractionated lime kiln dust.

Figure 14:
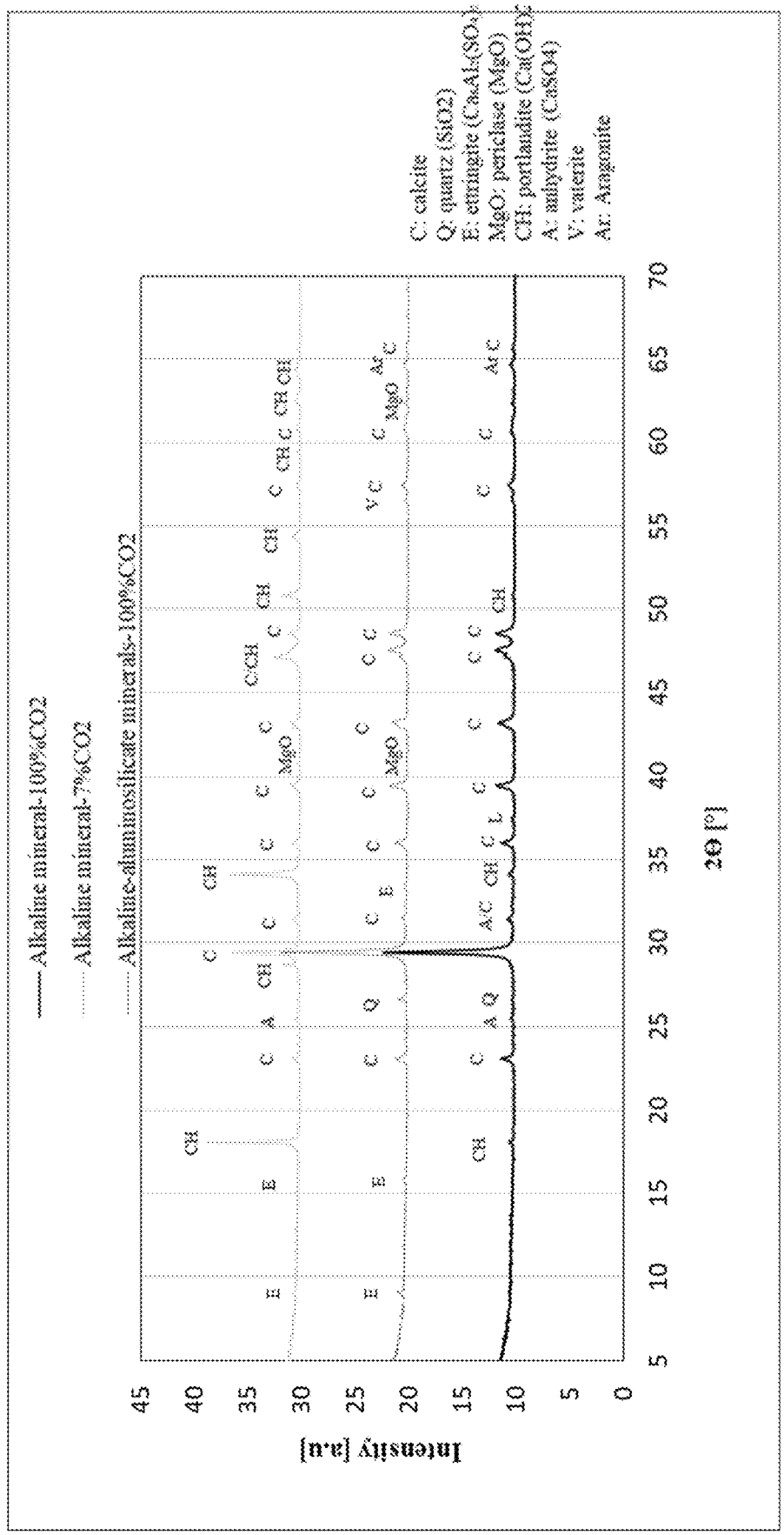

FIG. 14 shows an overlap of three x-ray diffraction plots for alkaline mineral-100%, alkaline mineral-7%, and alkaline-aluminosilicate minerals, and carbonated lime kiln dust. The carbonated lime kiln dust plot is shown on top. The hydrated lime kiln dust plot is shown in the middle. The as-received lime kiln dust is shown on the bottom.

Figure 15:
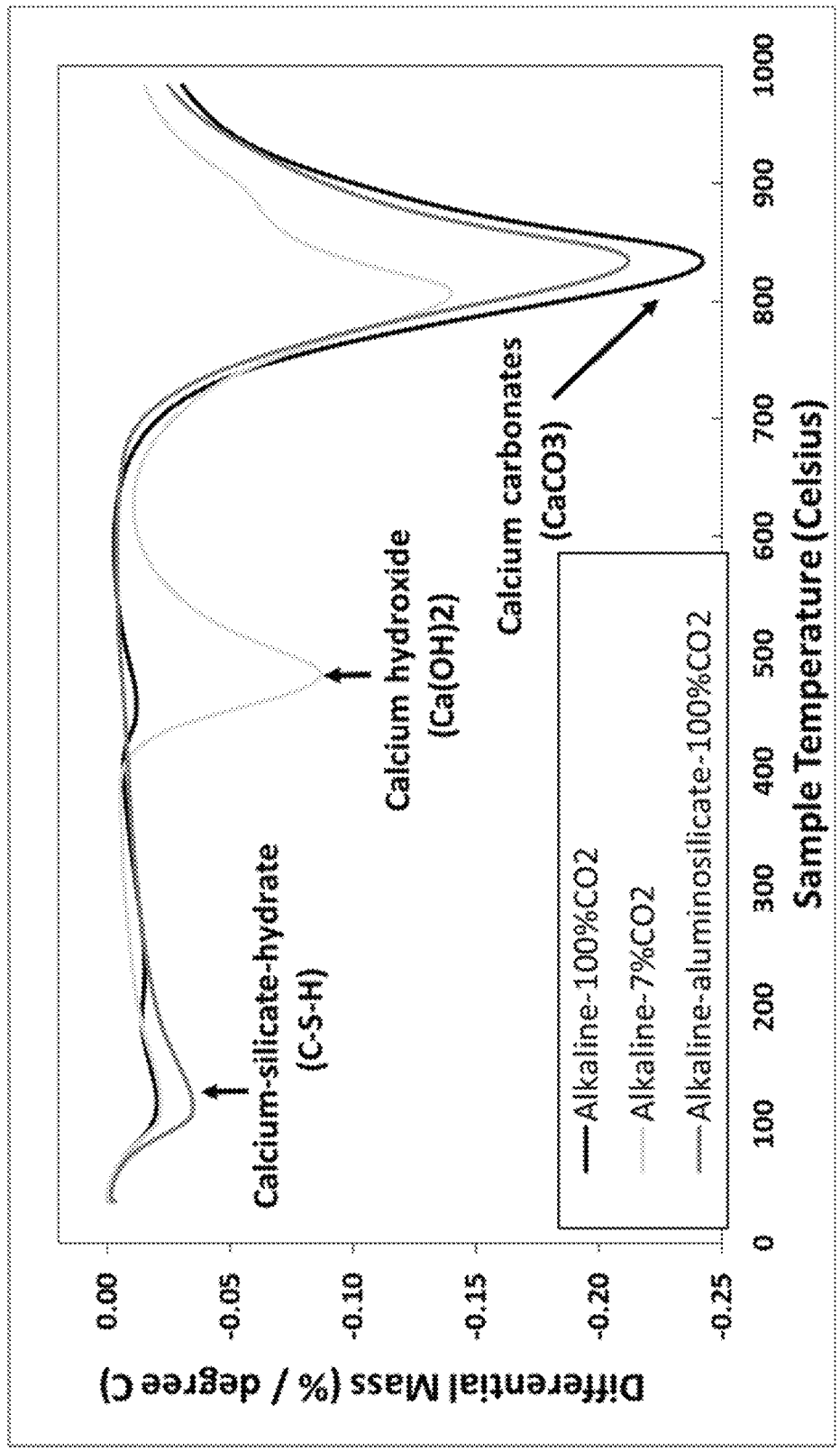

FIG. 15 shows a plot of differential mass (%/degree C.) as a function of sample temperature.

Figure 16:
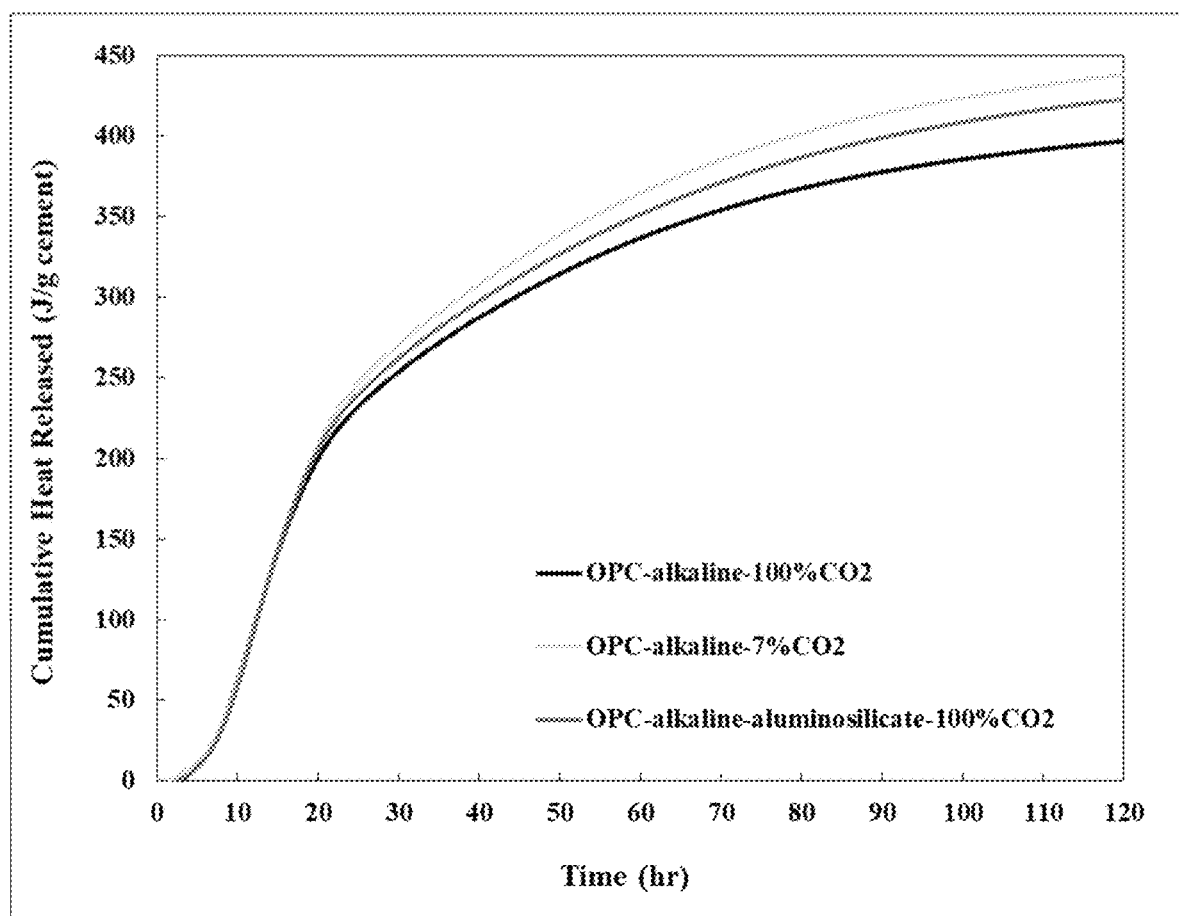

FIG. 16 shows a plot of cumulative heat released (J/g cement) as a function of time (hr) according to an embodiment. OPC stands for ordinary portland cement. OPC-alkaline-100%-$CO_2$ stands for ordinary portland cement with alkaline-rich mineral material that was exposed to 100% by volume $CO_2$. OPC-alkaline-7%-$CO_2$ stands for ordinary portland cement with alkaline-rich mineral material that was exposed to 7% by volume $CO_2$. OPC-alkaline-aluminosilicate-100%-$CO_2$ stands for ordinary portland cement with alkaline-rich mineral material and aluminosilicate material that was exposed to 100% by volume $CO_2$. In this example, the replacement rate of cement (OPC) by carbonated binder was 20 mass %.

Figure 17:
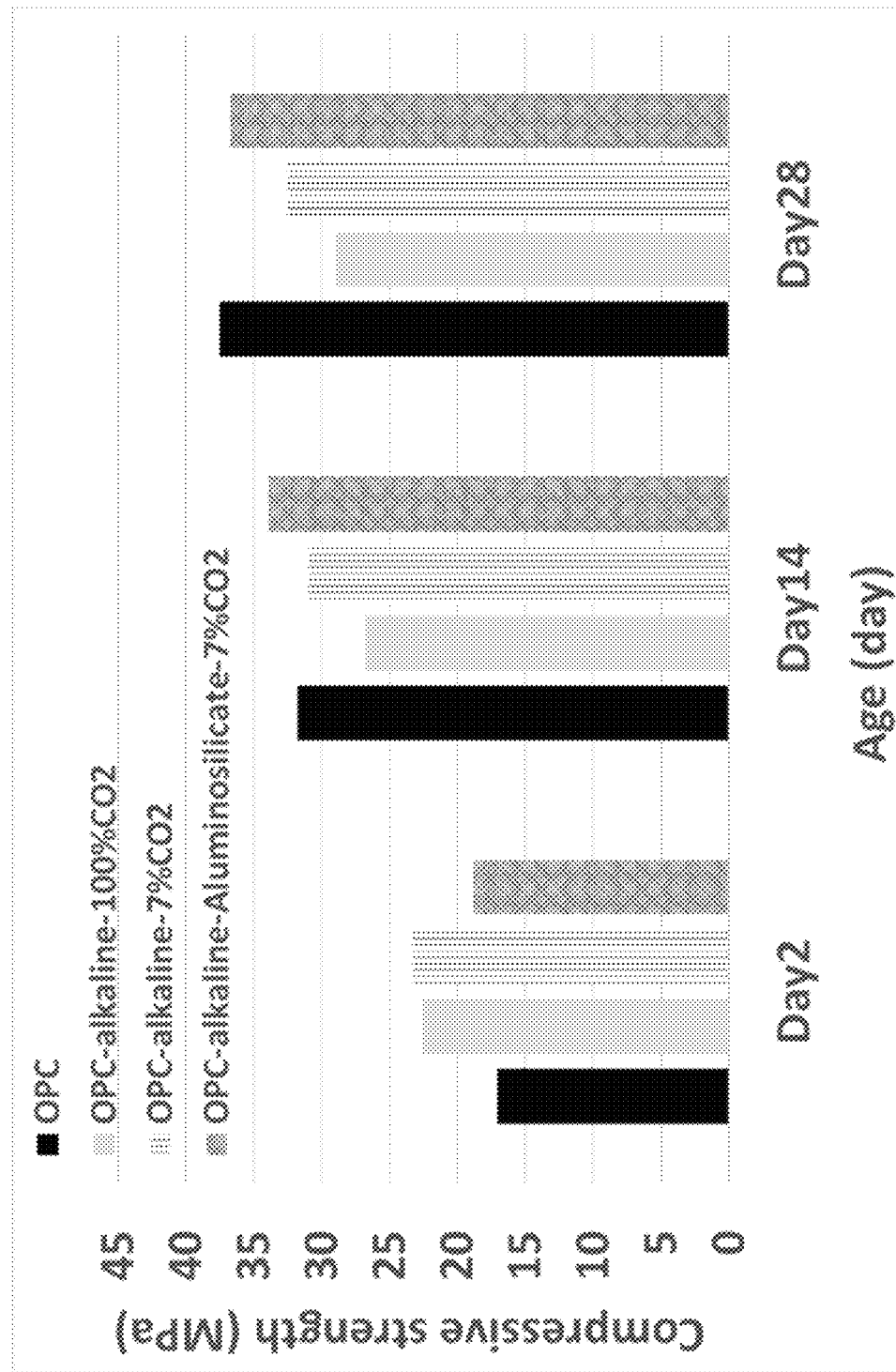

FIG. 17 shows a plot of compressive strength (MPa) as a function of Age (day) according to an embodiment. OPC stands for ordinary portland cement. OPC-alkaline-100%-$CO_2$ stands for ordinary portland cement with alkaline-rich mineral material that was exposed to 100% by volume $CO_2$. OPC-alkaline-7%-$CO_2$ stands for ordinary portland cement with alkaline-rich mineral material that was exposed to 7% by volume $CO_2$. OPC-alkaline-aluminosilicate-7%-$CO_2$ stands for ordinary portland cement with alkaline-rich mineral material and aluminosilicate material that was exposed to 7% by volume $CO_2$. In this example, the replacement rate of cement (OPC) by carbonated binder was 20 mass %.

Figure 18:
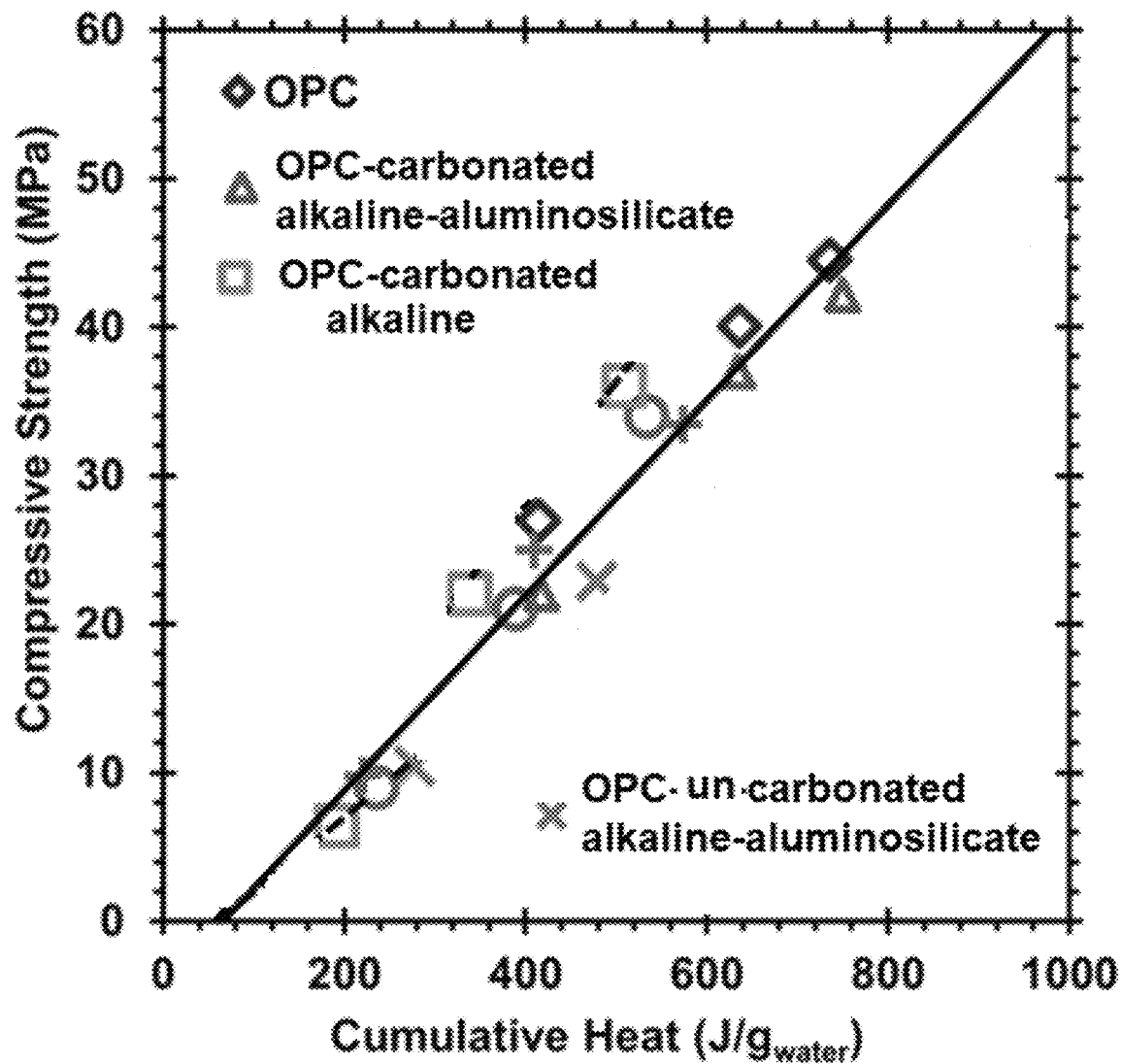

FIG. 18 shows a plot of compressive strength (MPa) as a function of cumulative heat released (J/g cement) according to an embodiment. OPC stands for ordinary portland cement. OPC-carbonated-alkaline-aluminosilicate stands for ordinary portland cement with carbonated alkaline rich mineral material and aluminosilicate material. OPC-carbonated-alkaline stands for ordinary portland cement with carbonated alkaline rich mineral material. OPC-uncarbonated-alkaline-aluminosilicate stands for ordinary portland cement with alkaline-rich mineral material and aluminosilicate material wherein the alkaline-rich mineral material is not carbonated. In this example, the replacement rate of cement (OPC) by carbonated binder ranged between 20-50 mass %.

DEFINITIONS

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is circular can refer to a diameter of the object. In the case of an object that is non-circular, a size of the non-circular object can refer to a diameter of a corresponding circular object, where the corresponding circular object exhibits or has a particular set of derivable or measurable characteristics that are substantially the same as those of the non-circular object. Alternatively, or in conjunction, a size of a non-circular object can refer to an average of various orthogonal dimensions of the object. Thus, for example, a size of an object that is an ellipse can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

As used herein, "carbonated materials" refers to materials made by contacting $CO_2$ to an alkaline-rich mineral material or an aluminosilicate mineral material or any combination thereof. Carbonated materials include, but are not limited to—calcite, vaterite, aragonite, magnesite, amorphous calcium carbonate, and combination thereof. Carbonated materials may include oxides, hydroxides, carbonates, silicates, aluminates, sulfites, sulfates, chlorides, nitrates, or nitrites of calcium and/or magnesium and/or other uni-/multi-valent elements, or any combination thereof so long as the oxides, hydroxides, silicates, aluminates, sulfites, sulfates, chlorides, nitrates, or nitrites of calcium and/or magnesium also include a carbonate phase.

As used herein, "alkaline-rich mineral materials" refers to materials which include Ca and/or Mg and which are used in industrial processes. Alkaline-rich mineral materials include, but are not limited to, $Ca(OH)_2$, lime kiln dust, lime, hydrated lime, cement kiln dust, calcium-rich coal combustion residues, slag, off-spec fly ashes, biomass ashes, fluidized bed combustion ashes, circulating fluidized bed ashes, off-spec limes, mineral sorbent/scrubbing residues comprising anhydrous CaO and/or Ca(OH)$_2$, and combinations thereof. The alkaline-rich mineral materials may further comprise at least one of oxides, hydroxides, carbonates, silicates, sulfites, sulfates, chlorides, nitrates, or nitrites of calcium and/or magnesium, or any combination thereof. Alkaline-rich mineral materials may also include virgin Ca(OH)$_2$.

Fly ash, as used herein, includes an amount of CaO and an amount of aluminosilicate. Often the CaO is chemically inaccessible and shielded in the interior or core of the fly ash particles by a passivated layer.

Lime, as used herein, includes CaO. Impure lime may include other impurities other than CaO.

As used herein, "aluminosilicate mineral materials" refers to materials which include silica and/or alumina in the form of amorphous or crystalline or combination thereof. Aluminosilicate mineral materials include, but are not limited to, coal combustion residues, slag, off-spec fly ashes, biomass ashes, fluidized bed combustion ashes, circulating fluidized bed ashes, calcium rich fly ashes, calcium-poor fly ashes, ponded ashes, landfilled ashes, bottom ashes, flue gas ashes, and combinations thereof. The aluminosilicate mineral materials may further comprise at least one of oxides, hydroxides, carbonates, silicates, sulfites, sulfates, chlorides, nitrates, or nitrites of calcium and/or magnesium, or any combination thereof.

Herein, a "residue" is an alkaline-rich mineral material or an aluminosilicate material which has been already contacted with CO$_2$-containing gas stream, for example, as a sorbent or scrubber in a CO$_2$-flue gas or it can be an aluminosilicate mineral material that has been obtained as solid waste through industrial process such as coal combustion residues. An alkaline-rich residue may include hydrated lime, lime kiln dust, off-spec limes, mineral sorbent/scrubbing residues, or a combination thereof. An aluminosilicate residue may include coal combustion residues, slag, off-spec fly ashes, biomass ashes, fluidized bed combustion ashes, circulating fluidized bed ashes, calcium rich fly ashes, calcium-poor fly ashes, ponded ashes, landfilled ashes, bottom ashes, flue gas ashes, and combinations thereof. A residue may be referred to in the art as a mineral sorbent.

As used herein, the "reaction medium" is the environment in which the alkaline-rich mineral material or aluminosilicate or calcium aluminosilicate mineral materials or any combination thereof is exposed to CO$_2$ during fractionation and/or grinding.

As used herein, the "mineral carbonation reactor" is a reactor used to produce calcium carbonate by exposing, in a confined space, alkaline-rich mineral materials to a CO$_2$-containing gas stream.

As used herein, "stirring carbonation reactor" is a reactor used to produce calcium carbonate by exposing, in a confined space, alkaline-rich mineral materials to a CO$_2$-containing gas stream while also stirring the alkaline-rich mineral materials.

As used herein, the term "flow-through chamber," refers to a chamber through which gas may be flowed continuously and at ambient pressure.

As used herein, the "mechanochemical process" is a process that includes simultaneous (1) fractionation and/or grinding of alkaline-rich and aluminosilicate mineral materials with (2) CO$_2$ exposure. In some examples, the fractionation and/or grinding includes using a ball miller. In some examples, reaction medium in the mechanochemical process is dry, semi-dry or humid environment. The reaction temperature in the mechanochemical process ranges from about 20° C. to about 80° C.

As used herein, "hydraulic-carbonating binder system" refers to binder system produced by mechanochemical process of an alkaline-rich mineral material or an aluminosilicate mineral material or any combination thereof. Hydraulic-carbonating binder system comprises oxides, hydroxides, carbonates, silicates, aluminates sulfites, sulfates, chlorides, nitrates, or nitrites of calcium and/or magnesium and/or other uni-/multi-valent elements, or any combination thereof. Hydraulic-carbonating binder systems include, but are not limited to, — calcite, vaterite, aragonite, magnesite, amorphous calcium carbonate or combination thereof. In some examples, hydraulic-carbonating binder system after mechanochemical process is further blended with an additional alkaline-rich mineral to supplement the alkali content.

As detailed herein, a binder system is made by fractionating and carbonating an otherwise passivated form of an alkaline-rich mineral material, optionally in combination or alternatively with, an aluminosilicate material. The fractionating exposes Ca or Mg that is covered in a passivating shell. The fractioning exposes Ca or Mg that can go on to further react with CO$_2$ to form carbonates once the fractioning releases the passivating shell.

As used herein, the "blending system" is the process to blend additional alkaline-rich mineral materials with hydraulic-carbonating binder system being produced through mechanochemical process to supplement alkaline (Ca and Mg) content of the binder system.

As used herein, the term "ambient pressure," refers to atmospheric pressure on planet Earth.

As used herein, the term "gas conditioning apparatus," refers to a system which is configured to receive a CO$_2$-containing flue gas stream and adjust the temperature, relative humidity, flow rate, or a combination thereof, of the CO$_2$-containing flue gas stream before flowing the CO$_2$-containing flue gas stream out of the gas conditioning apparatus.

As used herein, the term "CO$_2$-containing flue gas stream," refers to a gas stream effluent from a source which includes carbon dioxide (CO$_2$) such as industrial CO$_2$-containing gas stream, dilute flue gas stream, a concentrated CO$_2$ gas stream, biomass-derived CO$_2$ or atmospherically derived CO$_2$.

As used herein, the term "a carbonated concrete composite," refers to a carbonated concrete object (e.g., a building material) made from early-age (e.g., fresh) concrete that is then contacted with a CO$_2$-containing curing gas having a suitable CO$_2$ concentration.

As used herein, the term "concrete containing carbonated materials," refers to a concrete object that is composed of carbonated materials in the form of slurry, aggregate, or dry powder, or any combination thereof.

As used herein, the term "material performance of a carbonated concrete composite" is defined as porosity, compressibility, and/or other mechanical or strength measurement (e.g., Young's modulus, yield strength, ultimate strength, fracture point, etc.).

As used herein, the term "uniform material performance of a carbonated concrete component," refers to substantially uniform material properties throughout the concrete component. That is, there are no significant gradients or variations in material performance from one area of the concrete composite to another area of the concrete composite.

As used herein, the term "negatively affecting the material performance," refers to a material performance which is reduced in magnitude by a factor of 10 or more.

As used herein, the "reactive filler or supplementary cementitious materials" are materials that offer hydraulic or pozzolanic reactivity or a combination thereof that can be used as a partial replacement for cement.

As used herein, the term "fractionation" is a process that cracks, fractures, breaks, pulverizes, and/or exposes unreacted active sites (e.g., core) of alkaline-rich minerals via milling, grinding, or pulverizing process. The process removes passivating layers, such as but not limited to calcium carbonate layers, on alkaline-rich mineral materials. Fractionation reduces a particle's particle size.

As used herein, the term "ambient pressure," refers to atmospheric pressure on planet Earth. In an embodiment, ambient pressure is 1 atm.

As used herein, the extent of carbonation conversion and carbonation rate refers to the weight of calcium carbonate formed from the starting material, e.g., OPC or LKD.

As used herein, the phrase "mainly calcium carbonates and alumina-silica gel," refers to a product mixture that is more than 50% by weight calcium carbonate. In some embodiments, the mixture is more than 90% by weight calcium carbonate. In some embodiments, including any of the foregoing, when two starting materials are used, such as LKD and fly ash, in which one starting material includes Al phases, Si phases, or both, then both calcium carbonate and alumina-silica carbonates may form during carbonation curing. In some other embodiments, when one starting material, such as portlandite, is used and which only includes $Ca(OH)_2$, then calcium carbonate may form but alumina-silica carbonates will not form during carbonation curing.

As used herein, the phrase "alkaline-rich mineral materials that are at least partially carbonated," refers to alkaline-rich mineral materials that have some amount of calcium carbonate on their surface. A partially carbonated alkaline-rich mineral materials includes an alkaline-rich mineral material that has a discontinuous coating of calcium carbonate on its surface. A fully carbonated alkaline-rich mineral materials includes an alkaline-rich mineral material that has a continuous coating of calcium carbonate on its surface. Both partially carbonated alkaline-rich mineral materials and fully carbonated alkaline-rich mineral materials include an unreacted core. The partial or full carbonation of the alkaline-rich mineral materials refers to the extent that a carbonate coating is present on the alkaline-rich mineral materials.

As used herein, a "produced binder," refers to the binder system produced by a method herein which includes simultaneously fractioning and carbonating an alkaline-rich mineral material, an aluminosilicate material, calcium aluminosilicate a residue thereof, or a combination thereof.

As used herein, "alumina-silicate gel," refers to a type of geopolymer and includes an activated form of alkaline materials. The activated form includes materials which are formed by hydration and/or pozzolanic reactions. For example, hydraulic/pozzolanic activation of hydraulic-carbonating binder systems in concrete generates calcium silicate and calcium aluminate hydrates, carboaluminate phases, alumina-silica gel as well as AFt and AFm phases. Alumina-silica gel is a product that forms from the carbonation of alkaline-aluminosilicate or calcium silicate mixture.

EMBODIMENTS

The present disclosure relates to a process for producing hydraulic-carbonating binder systems, wherein the process comprises subjecting a blend of aluminosilicate and alkaline-rich mineral materials to a mechanochemical process. The mechanochemical process includes simultaneous fractionation (i.e., grinding) and carbonation, in which the blend of aluminosilicate and alkaline-rich mineral materials is contacted with a $CO_2$-containing gas stream in the mechanochemical reactor. Following mechanochemical process, the produced hydraulic-carbonating binder systems can be further blended with additional alkaline-rich mineral additive that has not been subjected to a mechanochemical process to supplement the alkali content of the hydraulic-carbonating binder systems. The hydraulic-carbonating binder systems comprise at least one of calcite, vaterite, or aragonite, magnesite, amorphous calcium carbonates, silicates, aluminates, sulfites, sulfates, chlorides, nitrates, or nitrites of calcium and/or magnesium and/or other uni-/multi-valent elements or any combination thereof. The hydraulic-carbonating binder system is activated through hydration/pozzolanic and carbonation reactions and offers cementation functions for precast and/or cast-in-place concrete applications.

In some embodiments, set forth herein is a mechanochemical process for making a binder system, comprising: providing a mixture of aluminosilicate material and alkaline-rich mineral material; wherein the alkaline-rich mineral material is at least partially carbonated; simultaneously fractioning the mixture, while contacting the mixture with a $CO_2$-containing gas; thereby making a binder system; wherein the binder system after simultaneously fractioning the mixture, while contacting the mixture with a $CO_2$-containing gas comprises less than 85% by weight (w/w) carbonates. In some embodiments, by keeping the carbonate content lower than 85% w/w but at least 20% higher than the amount of carbonates before simultaneously fractioning the mixture, while contacting the mixture with a $CO_2$-containing gas, the binder system produced has unexpectedly improved performance characteristics, which include, but are not limited to, forming industrially suitable concrete when used in a concrete mixture and further carbonated.

In some embodiments, including any of the foregoing, the alkaline-rich mineral residue is collected by contacting a mineral sorbent with a carbon dioxide-containing gas stream (e.g., a flue gas) using scrubbing or sorbent injection (dry or semi-wet) methods and lime kiln dust. In some embodiments, the mineral sorbent residue is obtained by contacting a mineral sorbent with an atmospheric carbon dioxide source.

In some embodiments, including any of the foregoing, the aluminosilicate mineral is collected from industrial solid wastes including coal combustion residues (e.g., class C fly ash, class F fly ashes), ponded ashes, landfilled ashes, and bottom ashes, biomass ashes, fluidized bed combustion ashes, circulating fluidized bed ashes, flue gas ashes, flue gas gypsum, cement kiln dust, and slag (e.g., basic oxygen furnace slag, electric arc furnace slag, ladle slag, or blast furnace slag).

In some embodiments, including any of the foregoing, the binder system after simultaneously fractioning the mixture, while contacting the mixture with a $CO_2$-containing gas comprises an amount of carbonates that is at least 20% greater than the amount of carbonates in the mixture before fractioning the mixture, while contacting the mixture with a $CO_2$-containing gas.

In some embodiments, including any of the foregoing, the carbonates are selected from calcium carbonate ($CaCO_3$), magnesium carbonate ($MgCO_3$), amorphous alumina-silica gel and hydrated alkalis comprising calcium hydroxide ($Ca(OH)_2$) and magnesium hydroxide ($Mg(OH)_2$), and combinations thereof.

In some embodiments, including any of the foregoing, the amount of aluminosilicate in the mixture before simultaneously fractioning the mixture, while contacting the mixture with a $CO_2$-containing gas, ranges from about 5% to about 75% w/w.

In some embodiments, including any of the foregoing, the amount of aluminosilicate or calcium aluminosilicate in the mixture before simultaneously fractioning the mixture, while contacting the mixture with a $CO_2$-containing gas, ranges from about 5% to about 75% w/w.

In some embodiments, including any of the foregoing, the amount of alkaline-rich mineral material in the mixture before simultaneously fractioning the mixture, while contacting the mixture with a $CO_2$-containing gas, ranges from about 2% to about 75% w/w.

In some embodiments, including any of the foregoing, the amount of alkaline-rich mineral material in the mixture before simultaneously fractioning the mixture, while contacting the mixture with a $CO_2$-containing gas, ranges from about 5% to about 75% w/w.

In some embodiments, including any of the foregoing, the amount of alkaline-rich mineral material in the mixture before simultaneously fractioning the mixture, while contacting the mixture with a $CO_2$-containing gas, ranges from about 5% to about 50% w/w.

In some embodiments, including any of the foregoing, the amount of calcium carbonate in the mixture before simultaneously fractioning the mixture, while contacting the mixture with a $CO_2$-containing gas, ranges from about 2% to about 50% w/w.

In some embodiments, including any of the foregoing, the amount of calcium carbonate in the mixture before simultaneously fractioning the mixture, while contacting the mixture with a $CO_2$-containing gas, ranges from about 5% to about 50% w/w.

In some embodiments, including any of the foregoing, the amount of calcium carbonate in the mixture before simultaneously fractioning the mixture, while contacting the mixture with a $CO_2$-containing gas, ranges from about 2% to about 30% w/w.

In some embodiments, including any of the foregoing, the amount of aluminosilicate or calcium aluminosilicate material and alkaline-rich mineral material, including any carbonates in the alkaline-rich mineral material, sum to 100% w/w of the mass of the mixture.

In some embodiments, including any of the foregoing, the amount of aluminosilicate material and alkaline-rich mineral material, including any carbonates in the alkaline-rich mineral material, sum to 100% w/w of the mass of the mixture.

In some embodiments, including any of the foregoing, the amount gypsum in the mixture before simultaneously fractioning the mixture, while contacting the mixture with a $CO_2$-containing gas, ranges is 0% w/w.

In some embodiments, including any of the foregoing, the amount gypsum in the mixture before simultaneously fractioning the mixture, while contacting the mixture with a $CO_2$-containing gas, ranges from about 1% to about 10% w/w.

In some embodiments, including any of the foregoing, the amount gypsum in the mixture before simultaneously fractioning the mixture, while contacting the mixture with a $CO_2$-containing gas, ranges from about 2% to about 10% w/w.

In some embodiments, including any of the foregoing, the mixture, before simultaneously fractioning the mixture, while contacting the mixture with a $CO_2$-containing gas comprises calcium carbonate phases ranging from about 2% to about 50% by mass.

In some embodiments, including any of the foregoing, the mixture, before simultaneously fractioning the mixture, while contacting the mixture with a $CO_2$-containing gas comprises calcium carbonate phases ranging from about 2% to about 30% by mass.

In some embodiments, including any of the foregoing, the amount of aluminosilicate or calcium aluminosilicate material, alkaline-rich mineral material, including any carbonates in the alkaline-rich mineral material, and gypsum, sum to 100% w/w of the mass of the mixture.

In some embodiments, including any of the foregoing, the amount of aluminosilicate material, alkaline-rich mineral material, including any carbonates in the alkaline-rich mineral material, and gypsum, sum to 100% w/w of the mass of the mixture.

In some embodiments, including any of the foregoing, the contacting occurs at ambient pressure.

In some embodiments, including any of the foregoing, the contacting occurs at ambient temperature.

In some embodiments, including any of the foregoing, the contacting occurs at temperatures ranging from 20° C. to 80° C.

In some embodiments, including any of the foregoing, the contacting occurs in a stirring carbonation reactor.

In some embodiments, including any of the foregoing, the fractioning exposes calcium or magnesium in the core of the alkaline-rich mineral material.

In some embodiments, including any of the foregoing, the fractioning exposes calcium or magnesium in the core of the aluminosilicate material and alkaline-rich mineral material.

In some embodiments, including any of the foregoing, the fractioning exposes calcium or magnesium in the core of the aluminosilicate or calcium aluminosilicate material and alkaline-rich mineral material.

In some embodiments, including any of the foregoing, the alkaline-rich mineral materials have a passivating layer on their surface prior to fractioning the alkaline-rich mineral materials.

In some embodiments, the material stream one of alkaline rich mineral and material stream two of aluminosilicate mineral are input in the mechanochemical reactor to subject fractionation and $CO_2$-containing gas stream.

In some embodiments, the weight ratio of material stream one of alkaline rich mineral and material stream two of aluminosilicate mineral in the mechanochemical reactor ranges from about 0.05 to about 0.95.

In some embodiments, the material stream one of alkaline rich mineral and material stream two of aluminosilicate or calcium aluminosilicate mineral are input in the mechanochemical reactor to subject fractionation and $CO_2$-containing gas stream.

In some embodiments, the weight ratio of material stream one of alkaline rich mineral and material stream two of aluminosilicate or calcium aluminosilicate mineral in the mechanochemical reactor ranges from about 0.05 to about 0.95.

In some examples, the mechanochemical process occurs in a solvent-free and dry reaction medium. The solvent-free and dry reaction medium would only have a $CO_2$-containing flue gas stream contacting the blend of aluminosilicate or calcium aluminosilicate and alkaline-rich mineral materials during fractionation and/or grinding and carbonation in mechanochemical reactor.

In some examples, the mechanochemical process occurs in a solvent-free and dry reaction medium. The solvent-free and dry reaction medium would only have a $CO_2$-containing flue gas stream contacting the blend of aluminosilicate and alkaline-rich mineral materials during fractionation and/or grinding and carbonation in mechanochemical reactor.

In some other examples, the mechanochemical process occurs in a semi-dry reaction medium. The semi-dry reaction medium would include the use of water vapor in combination with a $CO_2$-containing flue gas stream, both of which would contact the blend of aluminosilicate or calcium aluminosilicate and alkaline-rich mineral materials during fractionation and/or grinding and carbonation in mechanochemical reactor. The solvent-free and dry reaction would, in some examples, be performed in a flow-through reactor. The semi-dry reaction would, in some examples, be performed in a flow-through reactor. In the semi-dry process, in one embodiment, water is introduced using a humidifier which adjusts the relative humidity of the $CO_2$-containing gas stream. In the semi-dry process, in one embodiment, water is introduced using a dry $CO_2$-containing gas stream and spraying water into the carbonation reactor to wet and hydrated materials during mechanochemical process.

In some embodiments, including any of the foregoing, the mechanochemical reactor comprises a rotating reactor, fluidized bed reactor, which is configured to control material feeding rate, gas temperature, gas relative humidity, gas flow rate, gas recirculation rate, pH of the reaction medium, additive injection rate, reaction resistance time, rotating speed, and fractionation extent.

In some embodiments of the dry process and semi-dry process in the mechanochemical reactor, the relative humidity of $CO_2$ contacting gas stream ranges from about 10% to about 90%. In some embodiments, including any of the foregoing, the temperature of contacting $CO_2$-containing gas stream ranges from 20° C. to about 700° C. In some embodiments, including any of the foregoing, the $CO_2$ concentration of the $CO_2$-containing flue gas ranges from 5% to about 100% by volume.

In some embodiments, including any of the foregoing, the reaction residence time ranges from 5 minutes to about 48 hours. Herein, the reaction residence time is the time that the alkaline-rich mineral materials are in contact with the $CO_2$-containing gas while undergoing fractionation and/or grinding.

In some embodiments, including any of the foregoing, the flow rate of the $CO_2$-containing flue gas stream contacting the alkaline-rich mineral materials in the mineral carbonation reactor is at least 1 liter per minute (Standard liters per minute; SLPM).

In some embodiments, including any of the foregoing, the $CO_2$-containing gas stream is effluent from an industrial $CO_2$-containing gas stream, dilute flue gas stream, a concentrated $CO_2$ gas stream, a commercially available $CO_2$ source, liquefied $CO_2$, atmospherically-derived $CO_2$ (direct air capture), or biomass-derived $CO_2$.

Without being bound to theory, the fractioning and/or grinding of the alkaline-rich mineral material may help to access the Ca-rich (e.g., calcium hydroxide) in the core of a particle of industrial alkaline-rich mineral residues. Such residues may have passivating surface layers of calcium carbonate, calcium sulfate, calcium nitrate, or other calcium-including species. By grinding up these alkaline-rich mineral residues, the passivating surface layers can be fractured and the inner core of the particles accessed chemically. The core includes $Ca(OH)_2$ which is activated by being exposed by the process herein. The newly exposed surfaces areas increase the gas-solid interfaces and enhance carbonation kinetics when flowing $CO_2$-containing gas stream in the mechanochemical reactor.

In some embodiments, including any of the foregoing, the fractioning and grinding of the blend of aluminosilicate and alkaline-rich mineral materials during mechanochemical process increases the surface area and decreases the particle size of minerals thus enhancing hydration/pozzolanic reactivity and subsequent carbonation reaction.

In some embodiments, including any of the foregoing, the fractioning and grinding of the blend of aluminosilicate or calcium aluminosilicate and alkaline-rich mineral materials during mechanochemical process increases the surface area and decreases the particle size of minerals thus enhancing hydration/pozzolanic reactivity and subsequent carbonation reaction.

In some embodiments, fractionation process decreases degree of crystallinity and enhances the breakage of Si—O and Al—O bonds in aluminosilicate, calcium aluminosilicate, and alkaline-rich mineral materials, resulting in a faster dissolution and greater hydration/pozzolanic reactions of hydraulic-carbonating binder systems following mechanochemical process.

In some embodiments, the formation of carbonate phases onto surfaces of aluminosilicate and alkaline-rich mineral materials during mechanochemical process can stabilize the suppression of heavy metals (i.e., Hg, Zn, Pb, Cu, Cr, Cd, and Ni) or compounds comprising sulfates, sulfites, and/or chlorides that might be present in minerals. The carbonate layer formation can suppress the leaching of heavy metals when aluminosilicate and alkaline-rich mineral materials undergo dissolution. Herein, stabilizing the suppression of heavy metals includes forming $CaCO_3$ as a surface layer or coating, which prevents leaching of heavy metals after carbonation has occurred.

In some embodiments, including any of the foregoing, the binder system comprises aluminosilicate content ranging from about 5% to about 75% by mass.

In some embodiments, including any of the foregoing, the binder system comprises aluminosilicate or calcium aluminosilicate content ranging from about 5% to about 75% by mass.

In some embodiments, including any of the foregoing, the binder system comprises an alkaline content ranging from about 5% to about 50% by mass.

In some embodiments, including any of the foregoing, the binder system comprises calcium carbonates (e.g., calcite, vaterite and aragonite) ranging from about 2% to about 30% by mass.

In some embodiments, including any of the foregoing, the binder system comprises gypsum ranging from about 0% to about 10% by mass.

In some other embodiments, including any of the foregoing, the binder system comprises gypsum ranging from about 2% to about 10% by mass.

In some embodiments, including any of the foregoing, binder system is provided after the mechanochemical process.

In some embodiments, including any of the foregoing, the process further includes mixing additional alkaline-rich mineral material with the binder system after mechanochemical process until the $Ca(OH)_2$ amount in the binder system is at or between 20%-60% w/w of total binder system.

In some embodiments, including any of the foregoing, the process further includes mixing additional alkaline-rich mineral material with the binder system after making the binder system until the Ca(OH)$_2$ amount in the binder system is more than 20% w/w of total binder system.

In some embodiments, including any of the foregoing, the process further includes the mechanochemical process occurs a temperature of about 20° C. to about 80° C.

In some embodiments, including any of the foregoing, including any of the foregoing, the process temperature in mechanochemical reactor ranges from 20° C. to about 70° C. In some embodiment, hot CO$_2$ containing gas stream ranging from 30° C. to about 80° C. is contacted with blend of aluminosilicate or calcium aluminosilicate and alkaline-rich to dry materials in mechanochemical reactor. In some embodiment, hot CO$_2$ containing gas stream ranging from 20° C. to about 80° C. is contacted with blend of aluminosilicate and alkaline-rich in mechanochemical reactor to remove unburnt carbon present in materials during mechanochemical process.

In some embodiments, including any of the foregoing, including any of the foregoing, if both hydraulic reactions and pozzolanic reactions are occurring, the dominant reaction occurring is a carbonation reaction between the CO$_2$ and the calcium or magnesium exposed by simultaneously fractioning the mixture, while contacting the mixture with a CO$_2$-containing gas.

In some embodiments, including any of the foregoing, including any of the foregoing, the alkaline-rich mineral materials are not single phase materials.

In some embodiments, including any of the foregoing, including any of the foregoing, the alkaline-rich mineral materials comprise impurities.

In some embodiments, including any of the foregoing, including any of the foregoing, the process further includes using the produced binder to make concrete.

In some embodiments, including any of the foregoing, including any of the foregoing, the process further includes reacting the produced binder with cement to form carbonate/calcium-silicate-hydrate (C—S—H) composite phases in concrete.

In some embodiments, including any of the foregoing, including any of the foregoing, the process further includes using the produced binder to make concrete in a second process that comprises carbonation curing a cement mixture that comprises the produced binder and optionally aggregates, cement, or a combination thereof.

In some embodiments, including any of the foregoing, including any of the foregoing, the produced binder is in the form of dried powder, aggregate, or a slurry.

In some embodiments, including any of the foregoing, including any of the foregoing, the process further includes mixing additional alkaline-rich mineral material with the binder system after mechanochemical process until the calcium oxide amount in the mixture is at or between 20%-60% by weigh (w/w) of the mixture.

In some embodiments, including any of the foregoing, including any of the foregoing, the process further includes mixing additional alkaline-rich mineral material with the binder system after making the binder system until the calcium oxide amount in the binder system is more than 20% w/w of total binder system.

In some embodiments, including any of the foregoing, including any of the foregoing, the mechanochemical process occurs a temperature of about 20° C. to about 800° C.

In some embodiments, including any of the foregoing, including any of the foregoing, the temperature of the CO$_2$-containing gas ranges from 20° C. to about 60° C.

In some embodiments, including any of the foregoing, including any of the foregoing, the contacting the mixture with a CO$_2$-containing gas occurs at ambient pressure and temperatures ranging from 20° C. to 60° C.

In some embodiments, including any of the foregoing, including any of the foregoing, the contacting the mixture with a CO$_2$-containing gas occurs at ambient pressure and temperatures ranging from 20° C. to 40° C.

In some embodiments, including any of the foregoing, including any of the foregoing, the contacting the mixture with a CO$_2$-containing gas occurs at ambient pressure and temperatures ranging from 20° C. to 35° C.

In some embodiments, including any of the foregoing, including any of the foregoing, the contacting the mixture with a CO$_2$-containing gas occurs at ambient pressure and temperatures ranging from 20° C. to 32.5° C.

In some embodiments, including any of the foregoing, including any of the foregoing, the contacting the mixture with a CO$_2$-containing gas occurs at ambient pressure and temperatures less than 40° C.

In some embodiments, including any of the foregoing, including any of the foregoing, the contacting the mixture with a CO$_2$-containing gas occurs at ambient pressure and 32.5° C.

In some embodiments, including any of the foregoing, including any of the foregoing, the contacting the mixture with a CO$_2$-containing gas occurs a relative humidity of 20% to 80%.

In some embodiments, including any of the foregoing, including any of the foregoing, the contacting the mixture with a CO$_2$-containing gas occurs a relative humidity of 80%.

In some embodiments, including any of the foregoing, the alkaline-rich mineral materials have an average particle size of less than 5 mm. In some embodiments, the mineral materials have an average particle size of at least about 500 μm. In some embodiments, the mineral material has an average particle size of at least about 100 μm. In some embodiments, the mineral material has an average particle size of less than about 500 nm. In some embodiments, the mineral material has an average particle size of less than about 100 nm. In some embodiments, the mineral material has an average particle size of less than about 10 nm. In some embodiments, the mineral material has an average particle size of less than about 1 nm.

In some embodiments, including any of the foregoing, the aluminosilicate or calcium aluminosilicate mineral materials have an average particle size of less than 5 mm. In some embodiments, the mineral materials have an average particle size of at least about 500 μm. In some embodiments, the mineral material has an average particle size of at least about 100 μm. In some embodiments, the mineral material has an average particle size of less than about 500 nm. In some embodiments, the mineral material has an average particle size of less than about 100 nm. In some embodiments, the mineral material has an average particle size of less than about 10 nm. In some embodiments, the mineral material has an average particle size of less than about 1 nm.

In some embodiments, including any of the foregoing, the process occurs in a slurry.

In some embodiments, including any of the foregoing, the process occurs in an aqueous slurry.

In some embodiments, including any of the foregoing, the process occurs in a reaction medium, and wherein the reaction medium is selected from dry or semi-dry reaction medium.

In some embodiments, including any of the foregoing, the process occurs in a semi-dry reaction medium and comprises contacting water vapor in combination with a $CO_2$-containing flue gas stream with the mixture of aluminosilicate or calcium aluminosilicate material and alkaline-rich mineral material.

In some embodiments, including any of the foregoing, the process occurs in a semi-dry reaction medium, and the water-to-solid weight ratio (w/w) of the reaction medium in the semi-dry process ranges from 0 to about 0.5.

In some embodiments, including any of the foregoing, the process occurs in a carbonation reactor comprising flow-through reactor, or aqueous reactor, or stirring reactor, and wherein the reaction medium is selected from dry, semi-dry and aqueous reaction medium.

In some embodiments, including any of the foregoing, the process occurs in a flow-through reactor.

In some embodiments, including any of the foregoing, the flow-through reactor is selected from a rotating flow-through reactor or a fluidized bed reactor.

In some embodiments, including any of the foregoing, the reaction medium is semi-dry, and the liquid-to-solid weight ratio (w/w) ranges from 0.1 to about 10.

In some embodiments, including any of the foregoing, the reaction medium is aqueous, and the liquid-to-solid weight ratio (w/w) ranges from 0.1 to about 10.

In some embodiments, including any of the foregoing, the process is a solvent-free and dry process.

In some embodiments, including any of the foregoing, the process is a semi-dry process.

In some embodiments, including any of the foregoing, the $CO_2$-containing gas is a flue gas effluent from an industrial $CO_2$-containing gas stream, dilute flue gas stream, a concentrated $CO_2$ gas stream, a commercially available $CO_2$ source, liquefied $CO_2$, atmospherically-derived $CO_2$ (direct air capture), or biomass-derived $CO_2$.

In some embodiments, including any of the foregoing, the atmospherically-derived $CO_2$ is direct air capture $CO_2$.

In some embodiments, including any of the foregoing, the mixture of aluminosilicate or calcium aluminosilicate material and alkaline-rich mineral material increases the surface area of the aluminosilicate or calcium aluminosilicate material and alkaline-rich mineral material.

In some embodiments, including any of the foregoing, the water-to-solid weight ratio (w/w) of the reaction medium in the semi-dry process ranges from 0 to about 0.5. This ratio is controlled by controlling the relative humidity and moisture content of the $CO_2$-containing gas in the reactor. Without being bound to theory, it may be that the formation of liquid water films around surfaces of mineral materials enhances dissolution-precipitation reactions. Water may be introduced in the form of liquid water using a spray method or in the form of water vapor using humidified $CO_2$ containing gas.

In some embodiments, including any of the foregoing, the mechanochemical process under semi-dry conditions using humidified $CO_2$ gas stream helps convert free lime or anhydrous lime to hydrated lime thus enhancing the carbonation reaction of alkaline minerals when contacted with $CO_2$ containing gas stream in the mechanochemical process. The water present in $CO_2$ gas stream can serve as catalyst to enhance hydration and carbonation of blend of aluminosilicate or calcium aluminosilicate and alkaline-rich mineral materials.

In some embodiments, including any of the foregoing, the increased reactive sites of blend of aluminosilicate or calcium aluminosilicate and alkaline-rich mineral materials buffers pH (i.e., pH increases) of reaction medium during mechanochemical process that results in enhanced carbonation reaction of blend of aluminosilicate and alkaline-rich mineral materials during mechanochemical process. In some examples, the pH is buffered at or between 4.5 and 12.5.

In some embodiments, including any of the foregoing, the alkaline-rich mineral materials are simultaneously subjected to fractionation and $CO_2$ exposure (i.e., carbonation reaction) in a mechanochemical reactor which is configured to enhance intermixing and the gas-solid mass transfer occurring during calcium carbonate production and enhancing hydration/pozzolanic reactivity.

In some embodiments, including any of the foregoing, the mechanochemical reactor comprises a rotating flow-through reactor or fluidized bed reactors for dry and semi-dry reaction mediums which is combined with the milling process to provide combined fractionation and carbonation reaction in the mechanochemical reactor.

In some embodiments, including any of the foregoing, subjecting the mineral materials to fractionation/grinding comprises particle size reduction of particulates using mechanical-, acoustic-, thermal-, or electrical energy.

In some embodiments, including any of the foregoing, fractionation/grinding of mineral materials in a reactor comprises dry grinding, semi-wet grinding, or wet grinding. In some examples, a milling media is also used. In some examples, a milling media is steel balls, ceramic balls, or steel rods or any combination thereof.

In some embodiments, grinding aid additives including surfactants, amines, alcohols, glycols, carboxylic acids, triethanolamine (TEA), triisopropanolamine (TIPA), diethylene glycol (DEG), triethylene glycol (TEG), ethanol (EtOH), n-Heptanoic acid (HepAc), ammonium chloride, sodium lauryl sulfate (SLS), N-trimethyl ammonium bromide (CTAB), poly-carboxylate ether (PCE), and diethylisopropanolamine (DEIPA) can be used in the mechanochemical process to improve grinding process and reduce process energy and improve fineness of the blend of aluminosilicate or calcium aluminosilicate and alkaline-rich mineral materials. These additives allow for less energy use, more surface area, and better fractionation and pH buffering.

In some examples, additives are introduced by bubbling a $CO_2$-containing gas through an additive-containing solution. In some examples, additives are introduced by injecting solid additives into the carbonation reactor. In some examples, additives are introduced by mixing the additive with water and introducing the water mixture or water solution which results from the mixing into the carbonation reactor.

In some embodiments, including any of the foregoing, the carbonated materials that are formed in mechanochemical process has an average particle size of at least about 1,000 μm.

In some embodiments, including any of the foregoing, the carbonated materials that are formed in mechanochemical process has an average particle size of at least about 1 nm to about 1,000 nm.

In some embodiments, including any of the foregoing, the carbonated material has an average particle size of at least about 500 μm. In some embodiments, including any of the foregoing, the carbonated material has an average particle size of at least about 100 µm. In some embodiments, including any of the foregoing, the carbonated material has an average particle size of less than about 500 nm. In some embodiments, including any of the foregoing, the carbonated material has an average particle size of less than about 100 nm. In some embodiments, including any of the foregoing, the carbonated material has an average particle size of less than about 10 nm. In some embodiments, including any of the foregoing, the carbonated material has an average particle size of less than about 1 nm.

In some embodiments, including any of the foregoing, the hydraulic/pozzolanic reactivity and extent of calcium carbonates (e.g., calcite, vaterite and aragonite) are controlled by reaction residence time, temperature, relative humidity, gas flow rate, and $CO_2$ concentration of the contacting gas stream in the mechanochemical reactor.

In some embodiments, the processing conditions including reaction residence time, temperature, relative humidity, gas flow rate, and $CO_2$ concentration of the contacting gas stream in the mechanochemical reactor are adjusted to form calcium carbonate in hydraulic-carbonating binder system ranging from about 1% to about 35%.

In some embodiments, the processing conditions including reaction residence time, temperature, relative humidity, gas flow rate, and $CO_2$ concentration of the contacting gas stream in the mechanochemical reactor are adjusted to have 0% gypsum in the hydraulic-carbonating binder system.

In some embodiments, the processing conditions including reaction residence time, temperature, relative humidity, gas flow rate, and $CO_2$ concentration of the contacting gas stream in the mechanochemical reactor are adjusted to have gypsum in hydraulic-carbonating binder system ranging from about 0% to about 10%.

In some embodiments, the processing conditions including reaction residence time, temperature, relative humidity, gas flow rate, and $CO_2$ concentration of the contacting gas stream in the mechanochemical reactor are adjusted to have gypsum in hydraulic-carbonating binder system ranging from about 1% to about 10%.

In some embodiments, the processing conditions including reaction residence time, temperature, relative humidity, gas flow rate, and $CO_2$ concentration of the contacting gas stream in the mechanochemical reactor are adjusted to have alkaline content in hydraulic-carbonating binder system ranging from about 5% to about 50%.

In some embodiments, the processing conditions including reaction residence time, temperature, relative humidity, gas flow rate, $CO_2$ concentration of the contacting gas stream, and the content of alkaline-rich materials in the mechanochemical reactor are adjusted to produce an aluminosilicate or calcium aluminosilicate content in hydraulic-carbonating binder system ranging from about 5% to about 75% by mass.

In some embodiments, the processing conditions including reaction residence time, temperature, relative humidity, gas flow rate, $CO_2$ concentration of the contacting gas stream and content of alkaline-rich material in the mechanochemical reactor. In various embodiments, these processing conditions are adjusted to produce calcium carbonates (e.g., calcite, vaterite, and aragonite) and carbo-aluminate phases in the hydraulic-carbonating binder system. In some examples, the carbonate phases and carbo-aluminate phases range from about 2% to about 30% by mass of the binder system. The formation of calcium carbonate is controlled to ensure that reactivity of hydraulic-carbonating binder system is not decreased due to the formation of a carbonate layer on sites of binder system that may slow down the dissolution and hydration of these materials.

In some embodiments, the incorporation of alkaline-rich materials (Ca and Mg) in the mechanochemical process favors carbonation formation (e.g., calcium carbonate precipitation) on surfaces of alkaline rich materials than aluminosilicate materials since alkaline-rich materials carbonate faster than aluminosilicate or calcium aluminosilicate materials. This results in less deposition of calcium carbonates on surfaces of aluminosilicate materials that can impact aluminosilicate dissolution/hydration (i.e., reactivity).

In some embodiments, the mechanochemical process of the blend of aluminosilicate or calcium aluminosilicate and alkaline-rich mineral materials produces carbonated phases including at least one of calcite, vaterite, or aragonite, magnesite, amorphous calcium carbonates or combination thereof.

In some embodiments, including any of the foregoing, the process includes controlling temperature, relative humidity, concentration of $CO_2$, and the use of additives during mechanochemical process to favor the formation of vaterite or aragonite, or both, over the formation of calcite in the hydraulic-carbonating binder systems. For example, lower reaction temperatures (e.g., 50° C. or less) favor the formation of aragonite. Above 50° C., calcite is favored.

Higher $CO_2$ concentrations (e.g., 50% or more) also favor the formation of aragonite as well as the favor the formation of calcite.

Additives are needed in some examples to form vaterite or aragonite. Additives are not needed to form calcite.

In some examples, the process forms hydraulic-carbonating binder comprising vaterite as spherically shaped particles.

In some examples, the process forms hydraulic-carbonating binder comprising calcite as cubic-shaped particles.

In some examples, the process forms hydraulic-carbonating binder comprising aragonite as needle-shaped particles.

In some examples, the process herein forms hydraulic-carbonating binder comprising calcite.

In some examples, the process herein forms hydraulic-carbonating binder comprising calcite and vaterite.

In some examples, the process herein forms hydraulic-carbonating binder comprising calcite and aragonite.

In some examples, the process herein forms hydraulic-carbonating binder comprising calcite, vaterite, and aragonite.

In some examples, the process herein forms hydraulic-carbonating binder comprising aragonite and vaterite.

In some embodiments, including any of the foregoing, the polymorphism of produced calcium carbonates is controlled by contacting the alkaline-rich mineral materials with additives during the fractionation and/or grinding process. The additives may include, but are not limited to chlorides (e.g., $CaCl_2$), sulfates (e.g., $CaSO_4$), and ammonium salts (e.g., $NH_4NO_3$; $NH_4Cl$). In some examples, the additives are introduced using additive injection into the carbonation reactor where the alkaline-rich mineral materials are undergoing fractionation and/or grinding.

In some embodiments, including any of the foregoing, the produced hydraulic-carbonating binder systems after mechanochemical process are subjected to drying.

In some embodiments, the produced hydraulic-carbonating binder system after mechanochemical process is blended with alkaline rich mineral additive that has not been subjected to a mechanochemical process to supplement alkaline and gypsum content of hydraulic-carbonating binder systems.

In some embodiments, the total alkaline content (Ca and Mg) of the blended hydraulic-carbonating binder systems after mechanochemical and blending process ranges from about 5% to about 50%.

In some embodiments, including any of the foregoing, the produced hydraulic-carbonating binder systems are used in concrete in the form of powder for precast and/or cast-in-place concrete applications.

In another aspect, which may be combined with any other aspect or embodiment, the present disclosure sets forth a process for forming a concrete component comprising: forming a cementitious slurry comprising aggregates and carbonated materials obtained from the mechanochemical process, set forth herein, in the form of dry powder; shaping the cementitious slurry into a structural component; and exposing the structural component to carbon dioxide sourced from $CO_2$ emission sources (e.g., industrial $CO_2$-containing gas stream, dilute flue gas stream, a concentrated $CO_2$ gas stream), or from the atmosphere, thereby forming the concrete component.

In some embodiments, including any of the foregoing, the cementitious slurry further comprises a second mineral material that has not been subjected to a mechanochemical process to obtain the reactivated mineral material. Herein, the second mineral material may include, but is not limited to, cement, aggregate, fly ash, gypsum, lime kiln dust, cement kiln dust, and natural pozzolans.

In some embodiments, including any of the foregoing, the shaping comprises casting, extruding, molding, pressing, or 3D-printing of the cementitious slurry comprising carbonated materials.

In some embodiments, including any of the foregoing, the cementitious slurry comprising carbonated materials are cast without shaping such as ready-mix concrete applications.

In some embodiments, including any of the foregoing, the produced calcium carbonate materials can reduce cement content in concrete mixtures by up to 50% while fulfilling the performance requirements.

In some examples, including any of the foregoing, the methods herein include concurrent hydration/pozzolanic and carbonation reactions that result in hardening of hydraulic-carbonating binder systems. In certain examples, hydraulic/pozzolanic activation of hydraulic-carbonating binder systems in concrete generates calcium silicate and calcium aluminate hydrates, carboaluminate phases as well as AFt and AFm phases. The carbonation activation of hydraulic-carbonating binder systems in concrete generates calcium carbonate phases including at least one of calcite, vaterite, or aragonite, magnesite, amorphous calcium carbonates or combination thereof. The carbonation reaction of hydraulic-carbonating binder systems is activated when concrete is exposed to $CO_2$-containing gas streams.

In some examples, including any of the foregoing, the methods herein include using only hydraulic/pozzolanic reaction of hydraulic-carbonating binder systems. In some examples, including any of the foregoing, the methods herein include only carbonation reaction of hydraulic-carbonating binder systems. In some examples, including any of the foregoing, the methods herein include using concurrent hydraulic/pozzolanic and carbonation reactions of hydraulic-carbonating binder systems.

In some examples, including any of the foregoing, the process includes mixing additional alkaline-rich mineral material with the binder system after the mechanochemical process is completed until the $Ca(OH)_2$ amount in the binder system is at or between 20%-60% w/w of total binder system. The mixing of additional alkaline-rich mineral material with the binder system is a blending step which occurs after the mechanochemical process.

In some examples, including any of the foregoing, the process includes mixing additional alkaline-rich mineral material with the binder system after making the binder system until the $Ca(OH)_2$ amount in the binder system is more than 20% w/w of total binder system. The mixing of additional alkaline-rich mineral material with the binder system is a blending step which occurs after the mechanochemical process.

In some examples, including any of the foregoing, the fractioning the mixture of aluminosilicate or calcium aluminosilicate material and alkaline-rich mineral material increases the reactivity aluminosilicate material and alkaline-rich mineral material with $CO_2$.

In some examples, including any of the foregoing, fractioning the mixture of aluminosilicate or calcium aluminosilicate material and alkaline-rich mineral material decreases the average particle size of the aluminosilicate material and alkaline-rich mineral material.

In some examples, including any of the foregoing, the binder system produced is formulated as a slurry.

In some examples, including any of the foregoing, the binder system comprises calcium carbonate selected from vaterite, aragonite, calcite, an alumina-silica gel, and combinations thereof.

In some examples, including any of the foregoing, the alkaline-rich and aluminosilicate mineral materials is selected from virgin minerals, mineral residues, and combinations thereof. In some examples, the aluminosilicate material is a calcium aluminosilicate material.

In some examples, including any of the foregoing, the alkaline-rich and aluminosilicate mineral materials are mineral residues, and wherein mineral residues are generated from industrial processes. In some examples, the aluminosilicate material is a calcium aluminosilicate material.

In some examples, including any of the foregoing, the alkaline-rich and aluminosilicate mineral materials are mineral residues, and wherein mineral residues are selected from cement kiln dust, lime kiln dust, off-spec limes, sorbent/scrubbing residues, steel slag, iron slag, coal combustion residues, ponded ashes, landfilled ashes, bottom ashes, biomass ashes, fluidized bed combustion ashes, circulating fluidized bed ashes, and combinations thereof. In some examples, the aluminosilicate material is a calcium aluminosilicate material.

In some examples, including any of the foregoing, the process includes providing alkaline-rich mineral materials in a solution or slurry, and simultaneously fractioning the alkaline-rich mineral materials in the solution, while contacting the alkaline-rich mineral materials with a $CO_2$-containing gas; and wherein the process produces calcium carbonate, and further comprises filtering the calcium carbonate from the solution.

In some examples, including any of the foregoing, the solution comprises hydroxide ions, alkaline metal ions, or a combination thereof.

In some examples, including any of the foregoing, the solution has a pH greater than, or equal to, 10, after filtering the calcium carbonate from the solution.

In some examples, including any of the foregoing, the process includes contacting the solution after filtering the solution with the $CO_2$-containing gas to form additional calcium carbonate.

In some examples, including any of the foregoing, the process includes using the calcium carbonate made by the process as a reactive filler or supplementary cementitious material to make concrete.

In some examples, including any of the foregoing, the process produces calcium carbonate and further comprises using the calcium carbonate made by the process in a slurry, as a moist powder, or as a dry powder.

In some examples, including any of the foregoing, the calcium carbonate made from the process has a smaller particle size than the particle size of the alkaline-rich mineral particles.

In some examples, including any of the foregoing, the calcium carbonate made from the process has a smaller particle size than the particle size of the alkaline-rich mineral particles by a factor ranging from about 10% to about 95%.

In some examples, including any of the foregoing, the process includes conditioning the $CO_2$-containing gas to achieve an extent of carbonation conversion and carbonation rate of alkaline-rich mineral minerals of about 25% to about 100%.

In some examples, including any of the foregoing, the process includes adding an additive in addition to alkaline rich mineral prior to simultaneously fractioning the mixture, and while contacting the mixture with a $CO_2$-containing gas.

In some examples, including any of the foregoing, the process includes adding an additive in addition to alkaline rich mineral while simultaneously fractioning the mixture, and while contacting the mixture with a $CO_2$-containing gas.

In some examples, including any of the foregoing, the additive is added by mixing the additive with the alkaline-rich minerals at the beginning of the process.

In some examples, including any of the foregoing, the additive is added by injection addition.

In some examples, including any of the foregoing, the additive is added by spraying a solution of the additive and water onto the alkaline-rich mineral material during fractioning.

In some examples, including any of the foregoing, the process includes bubbling the $CO_2$-containing gas through a solution comprising the additive.

In some examples, including any of the foregoing, the additive is selected from the group consisting of surfactants, amines, alcohols, glycols, carboxylic acids, triethanolamine (TEA), triisopropanolamine (TIPA), diethylene glycol (DEG), triethylene glycol (TEG), ethanol (EtOH), n-Heptanoic acid (HepAc), ammonium chloride, sodium lauryl sulfate (SLS), N-trimethyl ammonium bromide (CTAB), poly-carboxylate ether (PCE), and diethylisopropanolamine (DEIPA) can be used in the mechanochemical process to improve grinding process and reduce process energy and improve fineness of the blend of aluminosilicate, calcium aluminosilicate and alkaline-rich mineral materials.

In some examples, including any of the foregoing, the carbonation products are mainly calcium carbonates comprising vaterite, aragonite, calcite, and alumina-silica gel, or a combination thereof.

In some examples, including any of the foregoing, the mixture comprises coal combustion residues.

In some examples, including any of the foregoing, the mixture comprises fly ashes.

In some examples, including any of the foregoing, the alkaline-rich mineral material are alkaline-rich mineral residues.

In some examples, including any of the foregoing, the alkaline-rich mineral material comprises fly ash, cement kiln dust, lime, or a combination thereof.

In some examples, including any of the foregoing, the alkaline-rich mineral material comprises fly ash and lime.

In some examples, including any of the foregoing, the alkaline-rich mineral material comprises cement kiln dust.

In some examples, including any of the foregoing, the alkaline-rich mineral material consists essentially of fly ash.

In some examples, including any of the foregoing, the alkaline-rich mineral residues are collected from flue gas treatments.

In some examples, including any of the foregoing, the flue gas treatments are selected from lime scrubbing materials, lime sorbents, lime sludge, and combinations thereof.

In some examples, including any of the foregoing, the alkaline-rich mineral material is a portlandite residue.

In some examples, including any of the foregoing, the portlandite is untreated.

In some examples, including any of the foregoing, the $CO_2$ concentration of the $CO_2$-containing gas ranges from 5% to about 100% by volume.

In some examples, including any of the foregoing, the reaction residence time for fractioning the mixture while contacting the mixture with a $CO_2$-containing gas ranges from 5 minutes to about 48 hours.

In some examples, including any of the foregoing, the flow rate of the $CO_2$-containing flue gas stream contacting the alkaline-rich mineral materials in the mineral carbonation reactor is at least 1 liter per minute.

In some examples, including any of the foregoing, the binder system is included in ready mix concrete.

In some examples, including any of the foregoing, the ready mix concrete comprises a mixture of water, hydraulic-carbonating binder system, cement, calcium carbonates, additives for precast and/or cast-in-place concrete, or a combination thereof.

In some examples, including any of the foregoing, the binder system is included in concrete.

In some examples, including any of the foregoing, the carbonation reactions occurring while fractioning the mixture while contacting the mixture with a $CO_2$-containing gas are controlled to minimize hydration reactivity slowing down of binder system.

In some examples, including any of the foregoing, the process includes contacting a $CO_2$-containing gas stream for carbonation curing to concrete comprising the binder system.

In some examples, including any of the foregoing, the process occurs in a carbonation chamber.

As set forth herein is a binder system for making concrete made by a process herein.

In some examples, including any of the foregoing, the binder system is a binary binder system.

In some examples, including any of the foregoing, the binder system is a ternary binder system.

In some examples, including any of the foregoing, the binder system is a quaternary binder system.

Also set forth herein is a concrete product made using a binder mixture herein.

Also set forth herein is a process for making a concrete product, comprising carbonation curing a mixture comprising the binder system set forth herein.

Also set forth herein is a concrete product made by a process herein.

EXAMPLES

Example 1—Prophetic Example

This Example would show the effects of processing parameters during mechanochemical activation on fineness, carbonate content, chemical composition, and mineralogical composition of the hydraulic-carbonating binder systems.

This Example shows how alkaline-rich mineral materials can be carbonated while being fractionated and this process can be used to form a binder system. That binder system is also useful for forming concrete when mixed with other concrete constituents such as aggregate and filler.

A mechanochemical reactor would be configured using a ball milling system that is connected to a $CO_2$-containing gas stream. In some examples, the ball milling system and $CO_2$-containing gas stream are included in a sealed container. Carbonate phases would be formed during a fractionation (i.e., milling) process to capture $CO_2$ during the fractioning. The relative humidity (RH) and temperature (T) would be monitored within the reactor (HX71V-A, Omega; Type T thermocouples, respectively) with a data acquisition system (cDAQ-9178, National Instruments; LabVIEW 2014). Dry gas mixtures with varying $CO_2$ concentrations would be prepared by mixing air and $CO_2$ at prescribed flow rates using mass flow controllers (Alicat). The mass flow controllers would be used to provide an inlet flow rate of 2 slpm (standard liter per minute) of dry gas per reactor. The dry gas mixtures would be humidified by bubbling the gas mixtures through gas washing bottles housed in a separate oven, the temperature of which would be controlled to achieve the desired RH within the feed gas stream. The particulate specimens (e.g., aluminosilicate and alkaline mineral materials) would be exposed to conditions ranging from 0.04% $CO_2$ (atmospheric) to 100% $CO_2$, 20° C. to 200° C., and 0% RH to 99% RH.

A similar set of experiments will be conducted on similar materials that would be subjected to fractionation using ball milling process without introducing $CO_2$ stream to assess the effect of carbonation reaction during mechanochemical process.

The effects of ball milling parameters such as ball-to-powder ratio, milling time, reaction medium (dry, semi-dry, liquid), reaction temperature on fineness and chemical and physical characteristics of hydraulic-carbonating binder systems would be evaluated.

The particle size distribution (PSD) of mineral materials before and after a mechanochemical process would be measured using static light scattering (SLS) using a Beckman Coulter LS13-320 particle sizing apparatus fitted with a 750 nm light source. The solid will be dispersed into primary particles via ultrasonication in isopropanol (IPA), which would also be used as the carrier fluid. The mineralogical compositions and chemical oxide composition of the mineral materials before and after the mechanochemical process would be determined using X-ray diffraction (XRD) and X-ray fluorescence (XRF), respectively. Furthermore, the specific surface area and pore volume of untreated mineral residues would be determined using BET (Brunauer-Emmett-Teller) and BJH (Barrett-Joyner-Halenda) measurements. The BET analysis would determine the specific surface area based on the monolayer adsorption of nitrogen, and the BJH analysis would determine the pore volume based on the multilayer adsorption of nitrogen.

Thermogravimetric analysis (TGA) would be used to assess the carbonation extent and carbonate phases of materials before and after the mechanochemical process. Around 50 mg of powder would be extracted from finished concrete products and heated from 35° C. to 975° C. at a rate of 15° C./min in aluminum oxide crucibles under ultra-high purity $N_2$ gas purge at a flow rate of 20 mL/min. The carbonate content would be quantified by assessing the mass loss associated with $CaCO_3$ decomposition over the temperature range of 550° C. to 950° C. It should be noted that the $CO_2$ uptake would account for the initial quantity of carbonates that are present in the mineral materials prior to the mechanochemical process. The carbonate phases including calcite, vaterite, aragonite, magnesite, amorphous calcium carbonate would be quantified and determined.

Example 2—Prophetic Example

This Example would show the effects of processing parameters during mechanochemical activation on reactivity and carbonation behavior of hydraulic-carbonating binder systems following mechanochemical process.

The hydraulic-carbonating binders would be tested for strength activity index using a fixed water-to-cementitious material ratio (w/cm); bulk electrical resistivity; calcium hydroxide content (CH) content in cement pastes using DSC/TGA and bound water to evaluate the hydraulic and pozzolanic reactivity of materials. Relationship between fineness and reactivity of hydraulic-carbonating binder would be established.

Electrical resistivity can be used to assess the interconnectivity of pores. The connectivity of pores can be reduced through the consumption of CH and precipitation of hydration products by pozzolanic materials, resulting in increased concrete resistivity. Electrical resistivity can be used as an indication of pozzolanicity of materials.

Similar set of experiments would be conducted on hydraulic-carbonating binders following $CO_2$ exposure during curing process to evaluate the effects of concurrent hydration-carbonation reactions of hydraulic-carbonating binders on strength development and pore structure refinement after carbonation curing. The relationship between alkali (Ca, Mg) contents of hydraulic-carbonating binders and $CO_2$ uptake following exposure to $CO_2$ gas would be established. Further, the carbonate phases formed during carbonation would be quantified and determined. These carbonates would include, but not necessarily be limited to, calcite, vaterite, aragonite, magnesite, and amorphous calcium carbonate.

Thermogravimetric analysis (TGA) would be used to assess the carbonation extent and $CO_2$ uptake of materials before and after the mechanochemical process. Around 50 mg of powder would be extracted from finished concrete products and heated from 35° C. to 975° C. at a rate of 15° C./min in aluminum oxide crucibles under ultra-high purity $N_2$ gas purge at a flow rate of 20 mL/min. The carbonate content would be quantified by assessing the mass loss associated with $CaCO_3$ decomposition over the temperature range of 550° C. to 950° C. It should be noted that the $CO_2$ uptake would account for the initial quantity of carbonates that are present in the mineral materials prior to the mechanochemical process.

Example 3—Prophetic Example

This Example would show the effects of chemical compositions, physical characteristics, and blending ratio of feeding materials on reactivity and carbonation behavior of hydraulic-carbonating binder systems following mechanochemical activation process.

The effects of chemical composition of feeding materials and blending ratio of alkaline and aluminosilicate mineral materials on chemical and physical characteristics of hydraulic-carbonating binder systems following mechanochemical activation would be evaluated.

Different alkaline rich minerals such as hydrated lime, lime kiln dust, cement kiln dust, off-spec limes and lime sorbent residues would be used. For aluminosilicate (e.g., calcium aluminosilicate) minerals, both a Class C (CA) and a Class F (FA) fly ash would be used to examine how fly ash calcium content affects test results because of the relative differences in hydraulic and pozzolanic reactivity that occurs in fly ashes due to calcium content. In addition, off-spec ashes such as biomass ashes, ponded ashes, CFB ashes would be tested to examine the effects of initial sulfur, carbonate contents and degree of crystallinity of materials on reactivity and carbonation behavior of hydraulic-carbonating binder systems following mechanochemical activation process.

The blending ratio of alkaline rich mineral (a) and aluminosilicate mineral (b) would be varied, wherein the a/b ratio ranges between 0 and 1 to examine the effects of chemical composition of feeding material on reactivity and carbonation behavior of hydraulic-carbonating binder systems following mechanochemical activation process.

The bound water, electrical resistivity, and strength activity index tests would be used to determine the reactivity of materials before and after the mechanochemical process and before and after carbonation curing.

Example 4—Prophetic Example

This Example would demonstrate mechanical properties and durability of concrete composites composed of hydraulic-carbonating binder systems.

The compressive strength, water absorption, electricity resistivity of concrete composites that are composed of hydraulic-carbonating binder systems would be determined. The effect of carbonation curing of concretes made with hydraulic-carbonating binder systems on mechanical properties and durability would be assessed at early and later ages. To provide a point of reference, similar concrete mixtures incorporating portland cement would be prepared and their corresponding compressive strengths would be measured.

Figure 1:
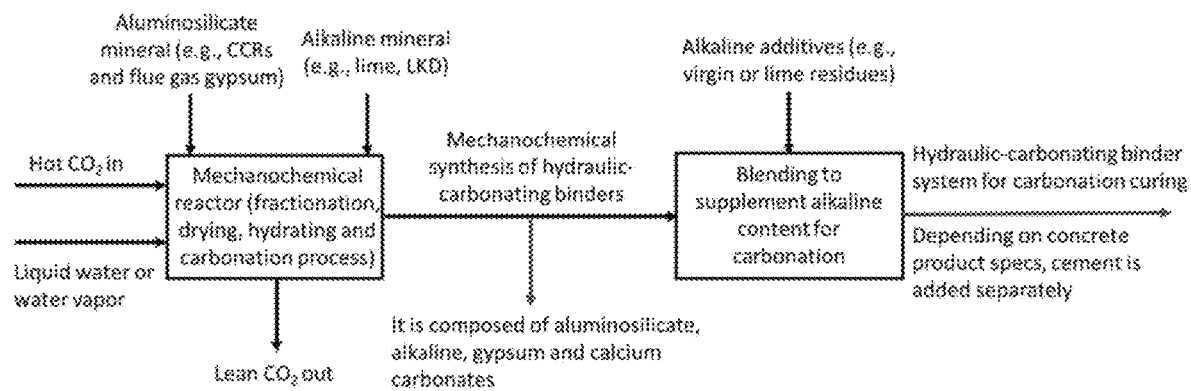
Figure 2:
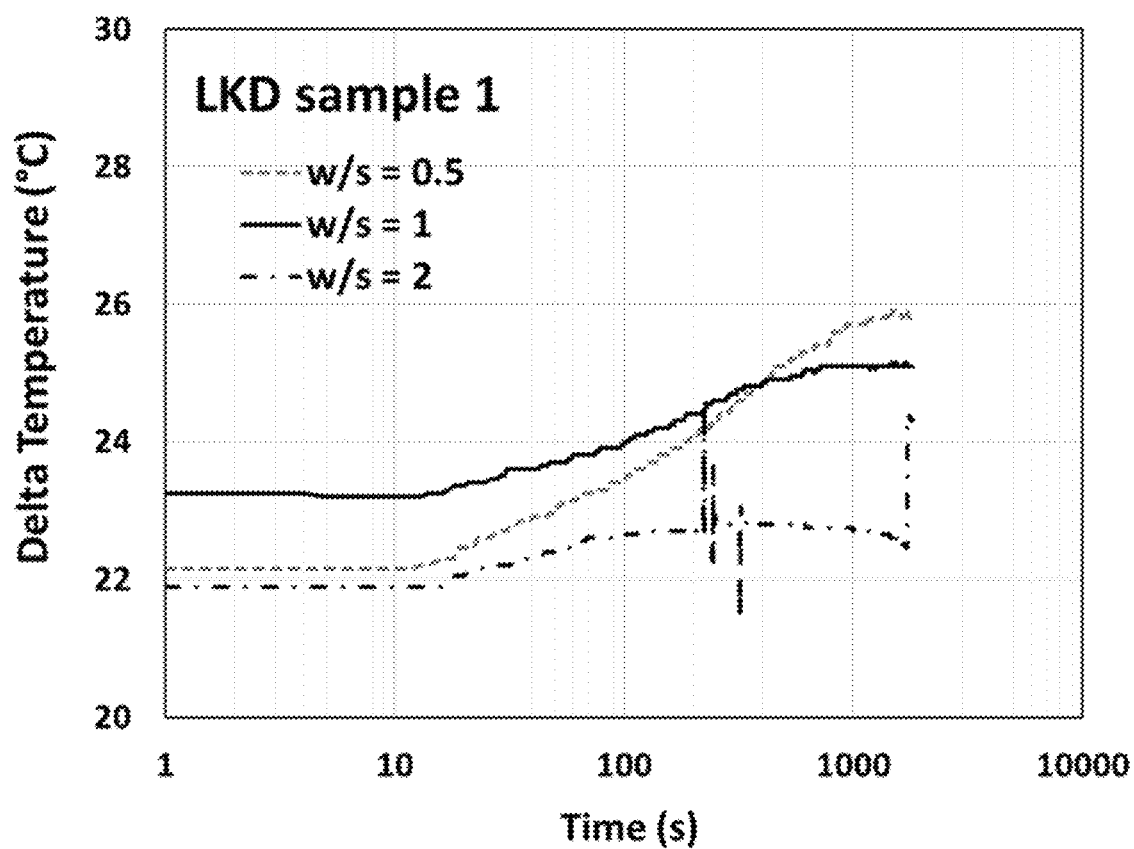
FIG. 2 shows the reactivity of lime kiln dust samples that are suspended in water as a function of time using the water extinction test following the European standard procedure (NF EN 549-2, 2002).
Figure 3:
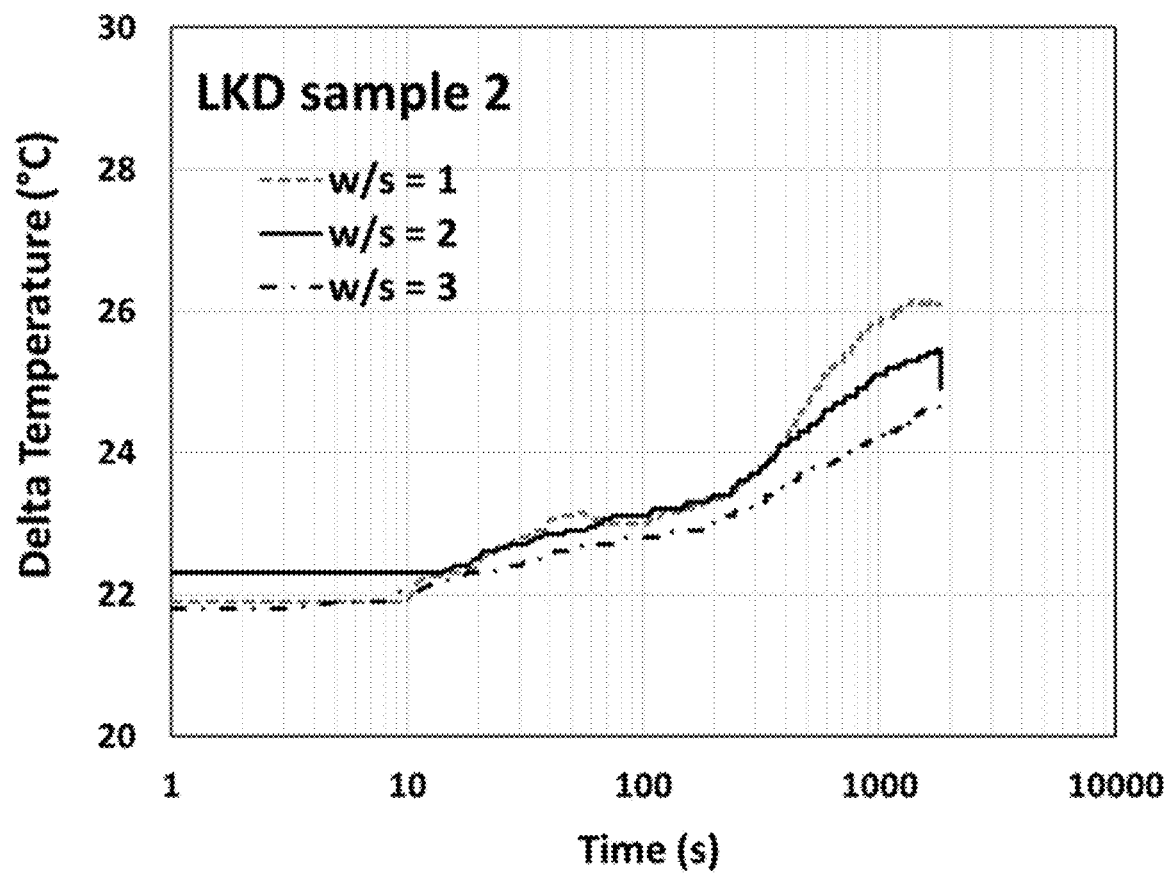
FIG. 3 shows the reactivity of lime kiln dust samples that are suspended in water as a function of time using the water extinction test following the European standard procedure (NF EN 549-2, 2002).
Figure 4:
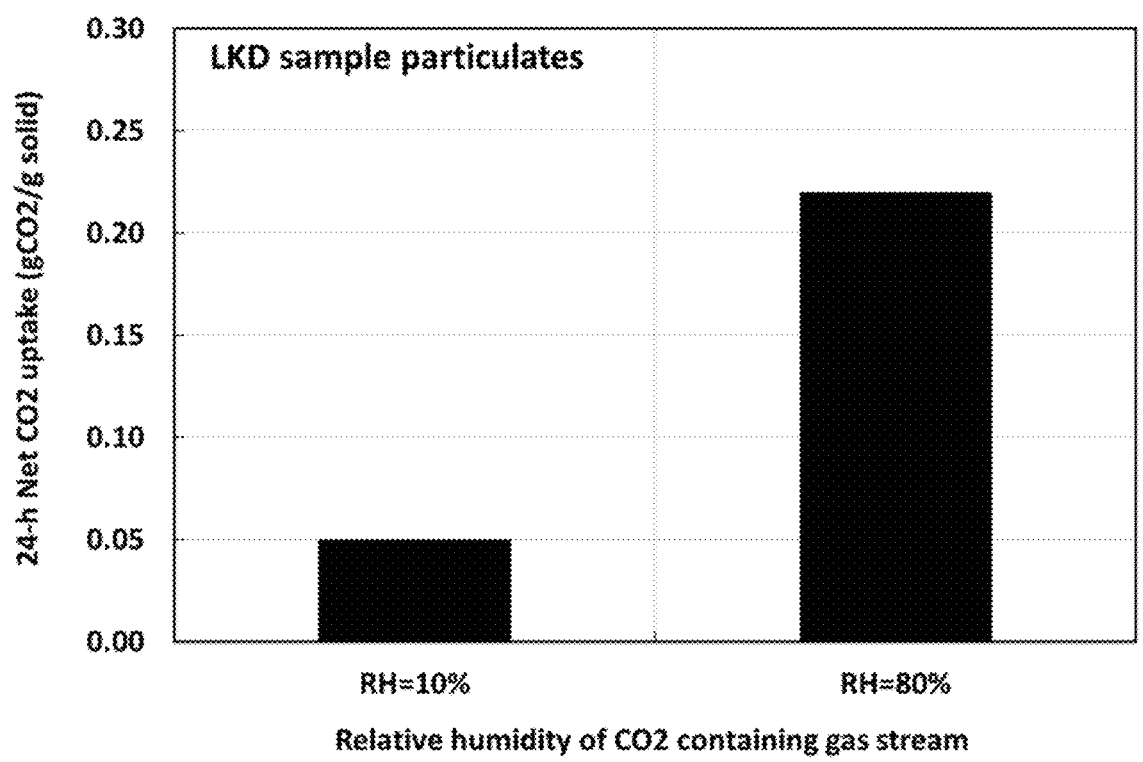
FIG. 4 shows the conversion of CaO to $Ca(OH)_2$ of LKD samples in the form of particulates after exposure to an air stream at varying relative humidity contents at T=50° C.
Figure 5:
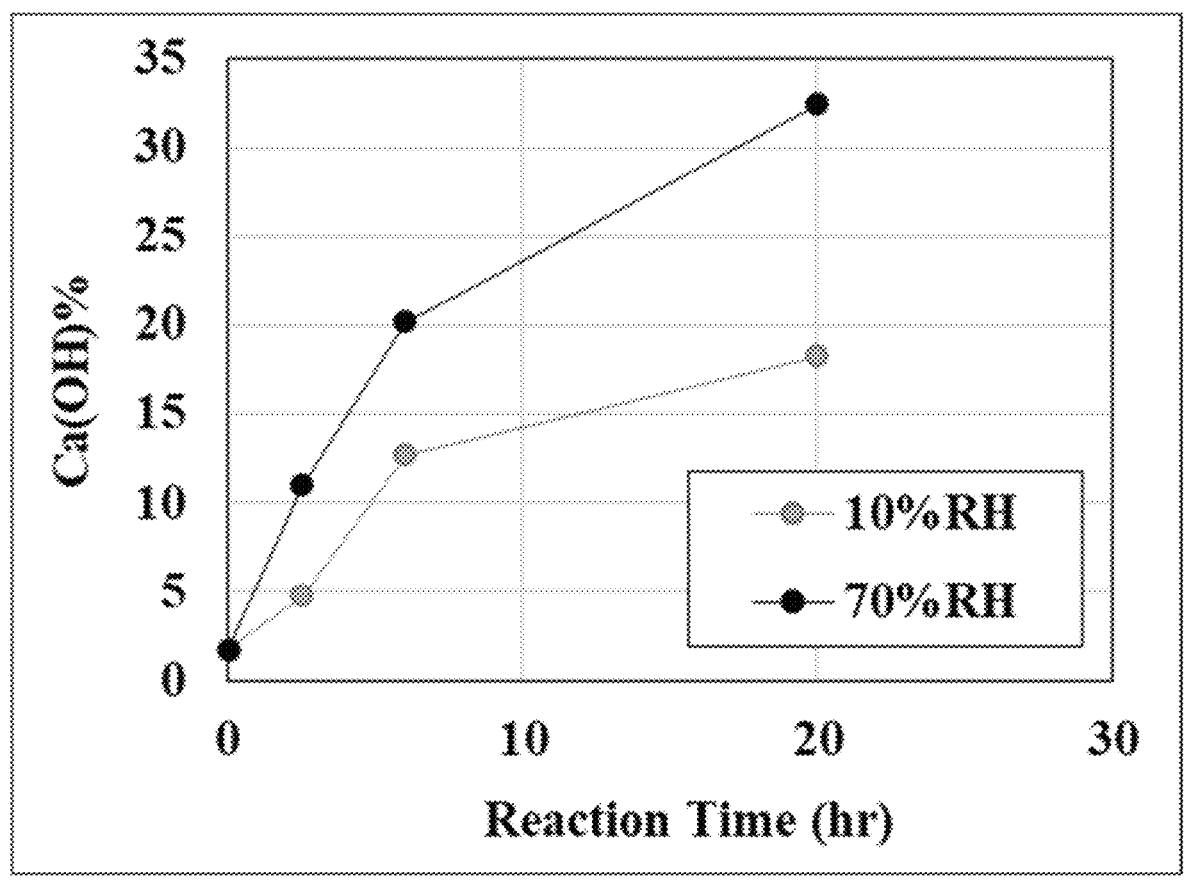
FIG. 5 shows the $CO_2$ uptake of LKD samples in the form of particulates after exposure to a $CO_2$-containing gas stream at 12 vol. % $CO_2$ and varying relative humidity contents at T=50° C. This example shows that a $CO_2$-containing gas stream in combination with water vapor when contacted with LKD, can introduce simultaneous hydration and carbonation of LKD samples.

Example 5—Hydration Kinetics of Alkaline-Rich Mineral Materials—Empirical Example This Example showed the effects of water content and processing conditions, such as temperature and relative humidity, on the reactivity and hydration kinetics of alkaline-rich minerals. In this example, lime kiln dust was used as an alkaline-rich mineral. Two different LKDs with different free lime (CaO) contents were used (Table 1). In this example, LKD materials were used as-is without any pretreatment or pre-carbonation. This example showed the relationship between the water content required for full hydration and the corresponding heat release of LKD as a function of free CaO content. The reactivity of samples was measured based on heat release as a function of time using the water extinction test following the European standard procedure (NF EN 549-2, 2002). Specifically, a mass of 150 g of lime is introduced into 600 g of water in an adiabatic flask and agitated by a magnetic stirrer. A thermometer was placed in the suspension to measure the temperature of the suspension. The temperature increased due to the heat released during the hydration of CaO and then reaches a plateau to a final value, which is recorded as the maximum temperature rise. Thermogravimetric analysis (TGA; STA 6000, Perkin Elmer) was used to assess the extent of $Ca(OH)_2$ before and after full hydration to estimate the extent of conversion of CaO to $Ca(OH)_2$ following the hydration reaction. Around 40 mg of carbonated material powder was heated from 35° C. to 975° C. at 15° C./min in an aluminum oxide crucible and under a 20 mL/min ultra-high purity $N_2$ purge. The $Ca(OH)_2$ content was quantified by assessing the mass loss due to dihydroxylation from the hydrated powder over the temperature range from 300° C. to 500° C. The results indicated that the water content required to achieve full hydration and their corresponding heat release is related to the free lime content of alkaline-rich materials (See FIGS. 2 and 3; and Tables 2 and 3). This example indicates that the time required to achieve full hydration in LKD samples varies with water content. This analysis can help inform the water requirement when LKD is used as a reactant in concrete mixtures. FIGS. 4-5, for example, provide example relative humidity conditions. The amount of hydration can be estimated from Table 3. During LKD hydration, lime (CaO) is converted to calcium hydroxide $(Ca(OH)_2)$.

TABLE 1

Bulk composition of two LKD samples as determined by X-ray fluorescence (XRF) analysis (wt. %)

| Sample | CaO | MgO | $Al_2O_3$ | $SiO_2$ | $SO_3$ |
|---|---|---|---|---|---|
| LKD sample 1 | 59.07 | 42.2 | 0.25 | 0.48 | 0.17 |
| LKD sample 2 | 77.1 | 3.89 | 2.57 | 5.34 | 8.48 |

TABLE 2

Complete hydration time of two LKD samples that are suspended in water as a function of time using the water extinction test following the European standard procedure (NF EN 549-2, 2002).

| Sample | Water/solid by mass ratio | Complete hydration time (second) |
|---|---|---|
| LKD sample 1 | 0.5 | 815 |
|  | 1 | 419 |
|  | 2 | 190 |
| LKD sample 2 | 1 | 1240 |
|  | 2 | 1078 |
|  | 3 | 784 |

TABLE 3

Conversion of lime (CaO) to calcium hydroxide $(Ca(OH)_2)$ of two LKD samples after complete hydration as determined by thermogravimetric analysis (TGA)

| Sample | $Ca(OH)_2$% by weight before hydration | $Ca(OH)_2$% by weight after hydration |
|---|---|---|
| LKD sample 1 | 6.99 | 22.19 |
| LKD sample 2 | 19.92 | 42.53 |

Example 6—Effects of Processing Conditions on Carbonation Kinetics of Alkaline-Rich Mineral Materials During Aqueous Carbonation—Empirical Example This Example shows the effects of water content and processing conditions, such as temperature and relative humidity, on the carbonation kinetics of alkaline-rich minerals. In this example, lime kiln dust was used as an alkaline-rich mineral. In this example, LKD material was used as received without any pre-treatment to remove passivated carbonate layer at particle surfaces.

A flow-through reactor, as noted above, was used to expose the LKD in the form of particulates at controlled temperatures (T), relative humidities (RH), and $CO_2$ concentrations [$CO_2$]. The reactors were housed horizontally in a digitally controlled oven for temperature control. The reactor was instrumented to monitor relative humidity (RH) and temperature (T). Dry gas mixtures with varying $CO_2$ concentrations were prepared by mixing air and $CO_2$ at prescribed flow rates using mass flow controllers. To control RH, the dry gas mixtures were humidified by bubbling the gas through washing bottles housed in a separate oven, the temperature of which was controlled to achieve the desired RH within the feed gas stream. The LKD reactants were exposed to 7-100% $CO_2$ by volume, 20° C. to 60° C., 30% RH to 100% RH, and flow rates of 1-5 standard liters per minute (slpm).

Similar experiments were conducted using a stirring aqueous carbonation reactor system with bead mills to provide simultaneous dissolution, carbonation, and fractionation under aqueous carbonation of alkaline-rich materials. The fractionation conditions included steel balls for the media, ball to powder mill ratio of 10, RPM of 50, and the water-to-solid ratio of 0.5 to 4.

Thermogravimetric analysis (TGA; STA 6000, Perkin Elmer) was used to assess the extent of carbonation experienced by the powder reactants. Around 40 mg of carbonated material powder was heated from 35° C. to 975° C. at 15° C./min in an aluminum oxide crucible and under a 20 mL/min ultra-high purity $N_2$ purge. The $CO_2$ uptake was quantified by assessing the mass loss from the carbonated powder that is associated with $CaCO_3$ decomposition over the temperature range from 550° C. to 900° C., normalized by the mass of the initially dry powder placed in the TGA.

FIG. 4 shows the $CO_2$ uptake of LKD particulates after twenty (20) hours of exposure to 12% $CO_2$ by volume as a function of time at T=40-50° C. and RH=80%. The LKD samples were as shown above in Table 1. This example shows that lime-$CO_2$ carbonation in the dry state is very slow and limited in which carbonation proceeds via a gas-solid reaction. The gas-solid reaction is hindered by surface passivation/barrier formation on surfaces of reactants (lime). When the water in the form of liquid or vapor is present, lime (CaO) is converted into calcium hydroxide ($Ca(OH)_2$) (FIG. 4) and then can get carbonated rapidly following exposure to $CO_2$ gas stream via a dissolution-precipitation pathway which enables near complete conversion (carbonation) of lime (FIG. 5). Based on water content and carbonation exposure condition, the hydration, and carbonation of lime mineral can occur simultaneously and continuously.

FIGS. 6-9 show the simultaneous fractionation with carbonation conversion ($CaCO_3$ content) of LKD under aqueous carbonation as a function of reaction time, $CO_2$%, flow rate, agitation speed, the water-to-solid ratio by mass, and reaction temperature. For each sample—E1 or E10—the numbers inside the parenthesis refer to, in series, the Reaction Temperature, the water-to-solid ratio, the $CO_2$ concentration, the flow rate, and the agitation ratio. For example, in FIG. 6, for E1 (25, 3, 100, 2, 200), the Reaction Temperature was 25° C., the water-to-solid ratio was 3, the $CO_2$ concentration was 100 volume percent, the flow rate was 2, and the agitation ratio was 200). The carbonation rate of LKD conversion enhances with increasing flow rate and $CO_2$% %. There is a reaction temperature (~32.5° C.) wherein carbonation conversion of alkaline reactants is promoted but at which additional temperature increase drops carbonation extent due to the exothermic nature of the carbonation reaction. This example demonstrates that carbonation conversion of alkaline-rich materials can be regulated by properties of $CO_2$-containing gas such as temperature, flow rate, and $CO_2$% as well as by reaction medium such as agitation/mixing speed, the reaction medium temperature and ball bead loading to control the extent of carbonation conversion of carbonatable minerals in this process in the range of about 25% to about 100%. Additionally, this example highlights that passivated carbonate layer around reactive surfaces of industrial solid wastes can be removed and depassivated to expose reactive sites and proceed with the dissolution-precipitation process.

Example 7—Mineral Composition and Particle Size Distribution of Carbonated Alkaline-Rich Mineral Materials During Aqueous Carbonation—Empirical Example To qualitatively examine the effects of carbonation, the mineralogical compositions of alkaline-rich materials before and after carbonation with simultaneous fractioning were assessed using XRD. Alkaline-rich material before and after carbonation were extracted from aqueous carbonation, vacuum dried, and ground into fine powders, and XRD patterns were collected by scanning from 5-to-70° (2θ) using a Bruker-D8 Advance diffractometer in a θ-θ configuration with Cu-Kα radiation (λ=1.54 Å) fitted with a VAN-TEC-1 detector. The diffractometer was run in continuous mode with an integrated step scan of 0.021° (2θ). A fixed divergence slit of 1.00° was used during X-ray data acquisition. To minimize artifacts resulting from preferred orientation and to acquire statistically relevant data, the (powder) sample surface was slightly textured, and a rotating sample stage was used. FIG. 10 shows the XRD patterns of LKD as-received, after full hydration and after carbonation. As can be seen from the phase peak, the CaO of LKD is transformed to $Ca(OH)_2$ following hydration and sequentially converted to $CaCO_3$ following carbonation with simultaneous fractioning under an aqueous carbonation reaction medium.

The particle size distribution (PSD) of the alkaline-rich materials before and after carbonation with simultaneous fractioning was assessed using static light scattering (SLS) using a Beckman Coulter LS13-320 particle sizing apparatus fitted with a 750 nm light source. The powders were dispersed into primary particles via ultrasonication in isopropanol (IPA), which was used as the carrier fluid in the SLS measurements. FIG. 11 shows the PSD of LKD as-received and precipitated calcium carbonates following carbonation under an aqueous carbonation reaction. As can be seen, the $D_{50}$ (50% passing diameter) of precipitated calcium carbonates is around 80% smaller than LKD before carbonation and fractionation using the conditions above.

Example 8—Mechanical Properties and Hydration Reactivity of Concrete Composed of Carbonated Alkaline-Rich Minerals as Cement Replacement This Example demonstrated the mechanical properties and hydration reactivity of concrete composites composed of carbonated materials. In this example, lime kiln dust was used as an alkaline-rich mineral. In this example, the replacement rate of cement by uncarbonated or carbonated alkaline-rich mineral was set between 10-20 mass %. The compressive strength of concrete composites that were composed of carbonated materials comprising calcium carbonates was measured as a function of time. To provide a point of reference, similar concrete mixtures incorporating portland cement and portland cement with uncarbonated alkaline-rich materials were prepared and tested for compressive strength. The influence of cement replacement with carbonated materials on the rate of reactions was tracked using isothermal conduction calorimetry. A TamAir isothermal calorimeter (TA Instruments) was used to determine the heat evolved during hydration at a constant temperature condition of 25° C. The thermal power and energy measured were then used to assess the influence of calcium carbonate precipitates on the reaction kinetics and cumulative heat release of the cementitious pastes.

FIGS. 12 and 13 show the effects of carbonated materials on the compressive strength and hydration kinetics of cementitious paste mixtures. The water-to-binder mass ratio was fixed at 0.48. The concrete mixture comprising carbonated LKD showed higher strength than uncarbonated LKD mixtures. Additionally, when carbonated LKD in combination with aluminosilicate (e.g., calcium aluminosilicate) materials such as fly ash was used at 30 mass % replacement for cement, the concrete mixtures indicated nearly comparative strength as reference concrete mixture made with portland cement. This shows a chemical synergy between aluminosilicate and carbonated minerals in a concrete mixture. The results indicate precipitated calcium carbonate addition is beneficial for concrete mixtures comprising aluminosilicate to improve compressive strength. When carbonate ions are present, for example, when provisioned by the dissolution of the $CO_2$ gas stream during carbonation curing as in this EXAMPLE 8, aluminosilicate materials react with carbonate species to form the $CO_3$-AFm (i.e., carbonate-AFm) phases. The extent of $CO_2$ conversion of carbonatable minerals in this process can be controlled to supplement the chemical reaction among carbonated minerals, uncarbonated alkaline-rich minerals, and other constituents in a binder system comprising cement and fly ash in concrete mixtures.

Example 9—Mechanical Properties and Hydration Reactivity as a Function of Carbonate Product Contents This Example demonstrated the effect of calcium carbonate formation on hydration kinetics and compressive strength of mortar mixtures containing cement and produced binder from mechanochemical process. The content of carbonates was controlled via processing conditions during production of binder system in mechanochemical process. Specifically, $CO_2$ concentration was decreased from 100% to 7 vol % and reaction time from 60 min to 45 min to regulate calcium carbonate contents. The alkaline and aluminosilicate precursors used here were LKD and fly ash, respectively.

The chemical composition of LKD is presented in Table 1. The chemical compositions of cement and fly ash are shown in Table 4.

TABLE 4

Oxide composition (by mass) of the fly ash and OPC as determined by XRF.

| | Mass (%) | |
|---|---|---|
| Oxide | Fly ash | Type I/II OPC |
| $SiO_2$ | 60.84 | 21.21 |
| $Al_2O_3$ | 22.30 | 4.16 |
| $Fe_2O_3$ | 4.75 | 3.85 |
| $SO_3$ | 0.62 | 2.81 |
| CaO | 6.38 | 65.50 |
| $Na_2O$ | 2.07 | 0.18 |
| MgO | 1.80 | 1.98 |
| $K_2O$ | 1.23 | 0.32 |

A TamAir isothermal calorimeter (TA Instruments) was used to determine the heat evolved during hydration at a constant temperature condition of 25° C. The thermal power and energy measured were then used to assess the influence of calcium carbonate precipitates on the reaction kinetics and cumulative heat release of the cementitious pastes. XRD patterns were collected by scanning from 5-to-70° (2θ) using a Bruker-D8 Advance diffractometer in a θ-θ configuration with Cu-Kα radiation (λ, =1.54 Å) fitted with a VANTEC-1 detector. The diffractometer was run in continuous mode with an integrated step scan of 0.021° (2θ). A fixed divergence slit of 1.00° was used during X-ray data acquisition. Thermogravimetric analysis (TGA; STA 6000, Perkin Elmer) was used to assess the extent of carbonation experienced by the powder reactants. Around 40 mg of carbonated material powder was heated from 35° C. to 975° C. at 15° C./min in an aluminum oxide crucible and under a 20 mL/min ultra-high purity $N_2$ purge. The $CO_2$ uptake was quantified by assessing the mass loss from the carbonated powder that is associated with $CaCO_3$ decomposition over the temperature range from 550° C. to 900° C., normalized by the mass of the initially dry powder placed in the TGA.

FIGS. 14 and 15 show the XRD patterns and TGA traces of plain alkaline and combined alkaline-aluminosilicate mixtures following mechanochemical process at 100% and 7 vol % $CO_2$ concentrations. The alkaline and aluminosilicate precursors used here were LKD and fly ash, respectively. The chemical composition of LKD is presented in Table 1. XRD peak associated with quartz for combined alkaline-aluminosilicate mixtures is an indication of silica gel formation. From TGA traces, total calcium carbonate contents for plain alkaline at 100% $CO_2$, plain alkaline at 7% $CO_2$ over reaction duration of 60 min and alkaline-aluminosilicate mixture at 100% $CO_2$ over reaction duration of 45 min were 85%, 55% and 65%, respectively.

FIGS. 16 and 17 show the effects of carbonated materials on the compressive strength and hydration kinetics of cementitious mortar mixtures. In this example, the replacement rate of cement (OPC) by carbonated binder was 20 mass %. The water-to-binder mass ratio was fixed at 0.48. The concrete mixture comprising carbonated alkaline at 7% $CO_2$ process indicated a higher strength and greater evolution heat than similar binder process at 100% $CO_2$. Additionally, binary binder system of alkaline-aluminosilicate at 100% $CO_2$ but reduced carbonation reaction time demonstrated the greatest compressive strength and heat of hydration. This shows a chemical synergy between carbonated products of alkaline and aluminosilicate and optimal content of carbonate product formation.

Example 10—Mechanical Properties and Hydration Reactivity as Binary Carbonated Binder System of Alkaline and Aluminosilicate This example demonstrates the synergy between combined alkaline and aluminosilicate material under mechanochemical process.

FIGS. 16 and 17 show the effects of carbonated materials on the compressive strength and hydration kinetics of cementitious mortar mixtures comprising produced binder systems from mechanochemical process. In this example, the replacement rate of cement (OPC) by carbonated binder was 20 mass %. The water-to-binder mass ratio was fixed at 0.48. The binary binder system of alkaline-aluminosilicate mixture indicated higher compressive strength and heat of hydration than plain carbonated alkaline. The alkaline and aluminosilicate precursors used here were LKD and fly ash, respectively. The chemical composition of LKD is presented in Table 1. The chemical composition of LKD is presented in Table 1. The chemical compositions of cement and fly ash are shown in Table 4.

Example 11—Correlating Reactivity to Compressive Strength of Mehcnochmical Binder Systems This example illustrates the correlation between reactivity and property of mortar mixtures comprising cement, sand, and mechanochemical binder systems. This example shows that the reactivity of a cement mixture can be tuned by adjusting the amount of carbonate formed by the processes herein when making the binder system in the cement. Isothermal calorimetry was used to estimate reactivity as a function of cumulative heat released and compressive strength was used to be an indication of property development. See FIG. 18. This plot demonstrates a generic linear relationship can be established between compressive strength evolution and cumulative heat release encompassing mechanochemical binder systems. In this example, the replacement rate of cement (OPC) by carbonated binder ranged between 20-50 mass %. The water-to-binder mass ratio was fixed at 0.48. This composition-reactivity-property relationship can be used as "master curves" to broadly estimate the time-dependent material performance of mechanochemical binder systems by simply using the experimentally measured calorimetry profiles to regulate reactivity and carbonates contents by means of operating processing conditions and composition of binder under mechanochemical process. The alkaline and aluminosilicate precursors used here were LKD and fly ash, respectively. The chemical composition of LKD is presented in Table 1. The chemical composition of LKD is presented in Table 1. The chemical compositions of cement and fly ash are shown in Table 4.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure. It should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto.

What is claimed is:

1. A mechanochemical process for making a precast reactive filler, cast-in-place reactive filler, or both, comprising:
   providing a mixture of aluminosilicate material, alkaline-rich mineral material, and at least one additive;
   wherein the alkaline-rich mineral material is partially carbonated;
   simultaneously fractioning the mixture, while contacting the mixture with a $CO_2$-containing gas in a reaction medium;
   thereby making a binder system;
   wherein the binder system, after simultaneously fractioning the mixture, while contacting the mixture with a $CO_2$-containing gas, comprises less than 85% by weight (w/w) carbonates reaction products selected from vaterite, aragonite, calcite, alumina-silica gel, or a combination thereof;
   wherein the reaction medium is, either:
   (a) aqueous, and the liquid-to-solid weight ratio (w/w) ranges from 0.1 to about 10; or
   (b) semi-dry, and the water-to-solid weight ratio (w/w) ranges from 0 to about 0.5.

2. The process of claim 1, wherein the aluminosilicate material is a calcium aluminosilicate material.

3. The process of claim 1, wherein the binder system, after simultaneously fractioning the mixture, while contacting the mixture with a $CO_2$-containing gas, comprises an amount of carbonates that is at least 20% greater than the amount of carbonates in the mixture before simultaneously fractioning the mixture.

4. The process of claim 1, wherein the binder system, after simultaneously fractioning the mixture, while contacting the mixture with a $CO_2$-containing gas, comprises calcium carbonate ($CaCO_3$), magnesium carbonate ($MgCO_3$), amorphous alumina-silica gel, hydrated alkalis comprising calcium hydroxide ($Ca(OH)_2$), magnesium hydroxide ($Mg(OH)_2$), or combinations thereof.

5. The process of claim 1, wherein the amount of aluminosilicate in the mixture before simultaneously fractioning the mixture, while contacting the mixture with a $CO_2$-containing gas, is from about 5% to about 75 w/w.

6. The process of claim 1, wherein the amount of aluminosilicate material and alkaline-rich mineral material, including any carbonates in the alkaline-rich mineral material, and additives in the mixture sums to 100% w/w of the mass of the mixture.

7. The process of claim 1, wherein the amount gypsum in the mixture, before simultaneously fractioning the mixture, while contacting the mixture with a $CO_2$-containing gas, ranges from about 1% to about 10% w/w.

8. The process of claim 1, wherein the mixture, before simultaneously fractioning the mixture, while contacting the mixture with a $CO_2$-containing gas, comprises calcium carbonate phases ranging from about 2% to about 50% by mass.

9. The process of claim 1, wherein the contacting occurs at ambient pressure and temperature ranging from 20° C. to 80° C.

10. The process of claim 1, wherein the contacting occurs in a stirring carbonation reactor, flow through reactor, or fluidized bed reactor under semi-dry or aqueous reaction mediums.

11. The process of claim 1, wherein the fractioning exposes calcium or magnesium in the core of the alkaline-rich mineral material.

12. The process of claim 1, wherein the alkaline-rich mineral materials comprise impurities.

13. The process of claim 1, further comprising using the produced binder to make concrete.

14. The process of claim 1, further comprising reacting the produced binder with cement to form carboaluminate hydrates, calcium-silicate-hydrate (C—S—H), calcium-aluminate-silicate-hydrate (C—A—S—H), ettringite, and intermixed carbonate/calcium-silicate-hydrate (C—S—H) composite phases in concrete.

15. The process any one of claim 1, further comprising using the produced binder to make concrete in a second process that comprises carbonation curing a concrete mixture that comprises the produced binder and optionally aggregates, cement, or a combination thereof.

16. The process of claim 1, wherein the produced binder is in the form of dried powder, aggregate, or a slurry.

17. The process of claim 1, wherein the $CO_2$-containing gas is a flue gas effluent from an industrial $CO_2$-containing gas stream, dilute flue gas stream, a concentrated $CO_2$ gas stream, a commercially available $CO_2$ source, liquefied $CO_2$, atmospherically-derived $CO_2$ direct air capture, or biomass-derived $CO_2$.

18. The process of claim 1, wherein the alkaline-rich and aluminosilicate mineral materials are mineral residues, and wherein mineral residues are generated from industrial processes.

19. The process of claim 1, wherein the alkaline-rich and aluminosilicate mineral materials are mineral residues, and wherein mineral residues are selected from cement kiln dust, lime kiln dust, cement paste, carbide lime, off-spec limes, sorbent/scrubbing residues, steel slag, iron slag, coal combustion residues, ponded ashes, landfilled ashes, bottom ashes, biomass ashes, fluidized bed combustion ashes, circulating fluidized bed ashes, and combinations thereof.

20. The process of claim 1, wherein the additive is selected from the group consisting of gypsum, magnesium chloride ($MgCl_2$), surfactants, amines, alcohols, glycols, carboxylic acids, triethanolamine (TEA), triisopropanolamine (TIPA), diethylene glycol (DEG), triethylene glycol (TEG), ethanol (EtOH), n-Heptanoic acid (HepAc), ammonium chloride, sodium lauryl sulfate (SLS), N-trimethyl ammonium bromide (CTAB), poly-carboxylate ether (PCE), diethylisopropanolamine (DEIPA), and combinations thereof.

* * * * *